United States Patent
Tanaka et al.

(10) Patent No.: US 6,604,506 B2
(45) Date of Patent: Aug. 12, 2003

(54) INTAKE MANIFOLD OF ENGINE

(75) Inventors: Takayuki Tanaka, Fuchu-cho (JP); Fusatoshi Tanaka, Fuchu-cho (JP); Kenya Ishii, Fuchu-cho (JP); Hiroshi Sumimoto, Fuchu-cho (JP); Yoshihiro Nakagawa, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/963,799

(22) Filed: Sep. 27, 2001

(65) Prior Publication Data

US 2002/0073961 A1 Jun. 20, 2002

(30) Foreign Application Priority Data

Sep. 28, 2000 (JP) .......................... 2000-297113
Sep. 29, 2000 (JP) .......................... 2000-301265
Sep. 29, 2000 (JP) .......................... 2000-301266

(51) Int. Cl.⁷ ............................ F02D 9/10; F02M 35/10
(52) U.S. Cl. .............. 123/336; 123/184.42; 123/184.52
(58) Field of Search ............................ 123/336, 184.42, 123/184.56, 184.43, 184.47, 184.48, 184.52

(56) References Cited

U.S. PATENT DOCUMENTS

| | | | |
|---|---|---|---|
| 4,911,111 A | * 3/1990 | Matsunaga | 123/184.55 |
| 5,158,045 A | * 10/1992 | Arthur et al. | 123/184.56 |
| 5,696,318 A | 12/1997 | Ernst et al. | |
| 5,715,782 A | 2/1998 | Elder | |
| 6,289,864 B1 | * 9/2001 | Vide et al. | 123/184.56 |
| 2002/0179030 A1 | * 12/2002 | Fiesel et al. | 123/184.42 |

FOREIGN PATENT DOCUMENTS

| | | |
|---|---|---|
| DE | 1031234 | 6/1966 |
| DE | 198 00 207 A1 | 9/1998 |
| EP | 08240123 | 9/1996 |
| EP | 1 024 279 A2 | 8/2000 |
| JP | 11-210576 | 8/1999 |

OTHER PUBLICATIONS

Fastened Seal for Improved Sealing, Research Disclosure, Kenneth Mason Publications, Hampshire GB, No. 375, Jul. 1, 995, p. 497.

* cited by examiner

*Primary Examiner*—Henry C. Yuen
*Assistant Examiner*—Arnold Castro
(74) *Attorney, Agent, or Firm*—Nixon Peabody LLP; Donald R. Studebaker

(57) ABSTRACT

To improve the efficiency of assembling multiple on-off valves into a manifold body and reduce resistance to rotation of a shaft after assembly, frame members (3) are fitted in downstream end portions of individual intake passage sections (12) of a manifold body (2), on-off valves (4) are placed inside the individual frame members (3) and a shaft (5) is passed through the on-off valves (4) in such a way that the frame members (3) constitute parts of inside walls of intake passages where the on-off valves (4) are located, the frame members (3) rotatably supporting the on-off valves (4) and the shaft (5). A cutout (23) is formed in a surrounding wall of each frame member (3), thereby making each frame member (3) expandable and compressible by elastic deformation. Protruding walls (24) swelling outward on both sides of the cutout (23) are formed on each frame member (3), and a recessed part (26) for accommodating the protruding walls (24) is formed in a wall surface of each intake passage section (12) of the manifold body (2). Further, there is formed a guide rail (27) which fits in the cutout (23) in the recessed part (26).

6 Claims, 21 Drawing Sheets

INTAKE MANIFOLD OF ENGINE

BACKGROUND OF THE INVENTION AND RELATED ART STATEMENT

The present invention relates generally to an intake manifold of an engine and, more particularly, it is concerned with a structure in which a multiple on-off valve mechanism having a plurality of on-off valves which are supported by a common shaft is incorporated in downstream end portions of individual intake passages which branch out from a joint portion.

Conventionally known arrangements include, for example, a structure disclosed in Japanese Unexamined Patent Publication No. 8-240123, in which on-off valves (flap valves) for regulating intake gas flow are provided in intake passages in an intake manifold that are connected to individual cylinders. In the structure of this Patent Publication, the individual on-off valves are mounted on a common shaft to form a multiple on-off valve mechanism and a driving device is connected to one end of the shaft at an outer side portion of the intake manifold, wherein the driving device rotates the shaft, causing the individual on-off valves to simultaneously open and close.

The structure of the Patent Publication is characterized in that the individual on-off valves joined to the shaft are accommodated in downstream end portions of the respective intake passages and supporting frames are fitted into the intake passages from their downstream end openings, the supporting frames serving to hold the shaft and secure it to the intake passages, so that the structure can be manufactured at low cost.

According to the structure described in the Patent Publication cited above, the multiple on-off valve mechanism is assembled into the intake manifold by first accommodating the individual on-off valves in specific parts of the downstream end portions of the respective intake passages and then fitting the aforementioned supporting frames in the intake passages in such a way that the on-off valves would not be displaced. As the supporting frames need to be formed such that they would accurately fit in the intake passages without any looseness, it is extremely difficult to fit the supporting frames after aligning them with the intake passages and on-off valves. Thus, there is room for improvement in assembling efficiency.

In addition, since the supporting frames hold and secure the shaft in the intake manifold when the supporting frames are fitted into the intake passages, there is a problem that resistance to rotation of the shaft tends to increase in the aforementioned structure.

SUMMARY OF THE INVENTION

In the light of the foregoing problems of the prior art, it is an object of the invention to provide an intake manifold of an engine that can improve the efficiency of assembling on-off valves into the manifold and reduce resistance to rotation of a shaft after assembly.

According to the invention, an intake manifold of an engine comprises a multiple on-off valve mechanism which is provided at downstream end portions of individual intake passages branching out from their joint portion, the multiple on-off valve mechanism having a plurality of on-off valves linked to a common shaft, wherein frame members formed separately from a manifold body are fitted in the downstream end portions of individual intake passage sections, the on-off valves are placed inside the individual frame members and the shaft is passed through the on-off valves in such a way that the frame members constitute parts of inside walls of the intake passages where the on-off valves are located, the frame members rotatably supporting the on-off valves and the shaft, and wherein a cutout is formed in a surrounding wall of each frame member, the cutout extending along the intake passage axis line all across the surrounding wall and thereby making each frame member expandable and compressible by elastic deformation.

In this construction, the on-off valves are assembled in the frame members, the frame members are fitted in the downstream end portions of the individual intake passage sections, and the shaft is assembled. This construction facilitates assembly of the intake manifold provided with the multiple on-off valve mechanism. Especially because the frame members are expandable and compressible by elastic deformation, the on-off valves can be easily fitted in the frame members and the frame members can be inserted into the downstream end portions of the intake passage sections with ease.

These and other objects, features and advantages of the present invention will become apparent upon reading of the following detailed description along with the accompanied drawings.

DETAILED DESCRIPTION OF THE PREFERRED EMBODIMENTS OF THE INVENTION

Figure 1:
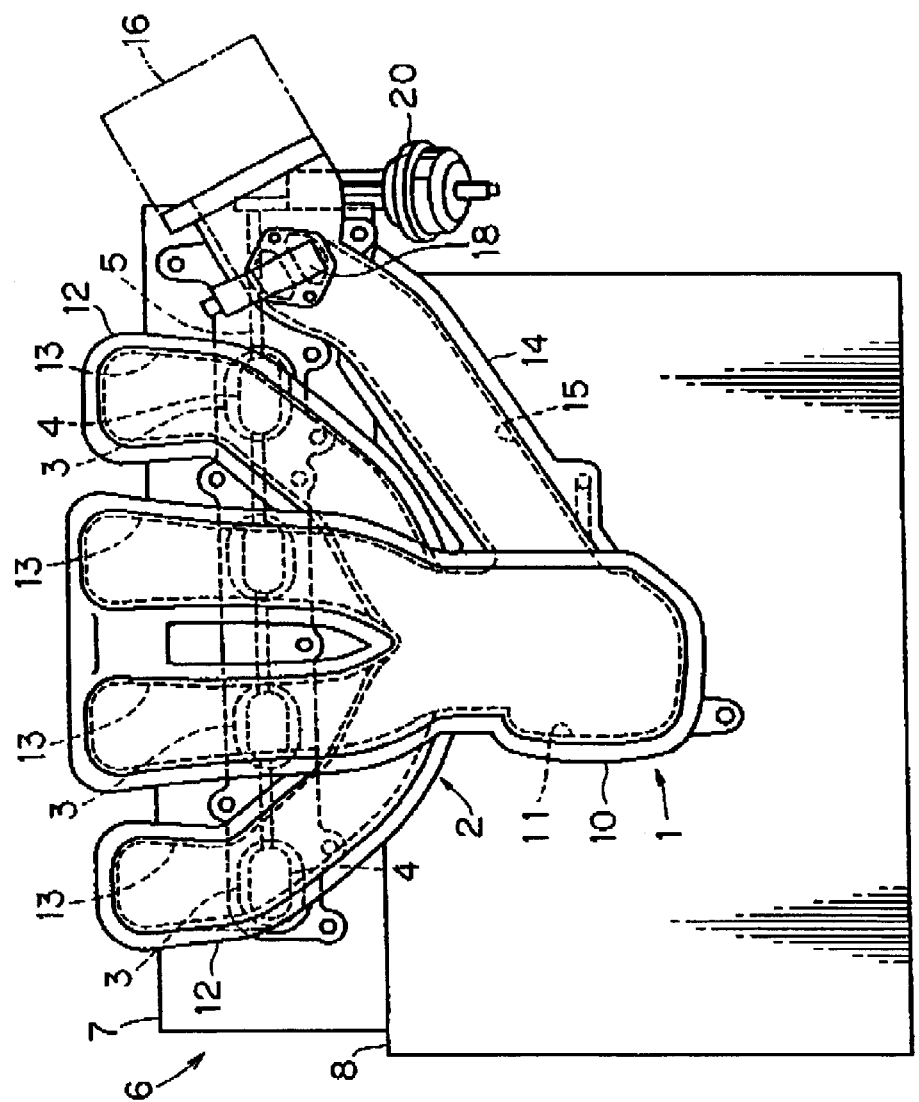
FIG. 1 is a front view of an intake manifold of an engine according to an embodiment of the invention.
Figure 2:
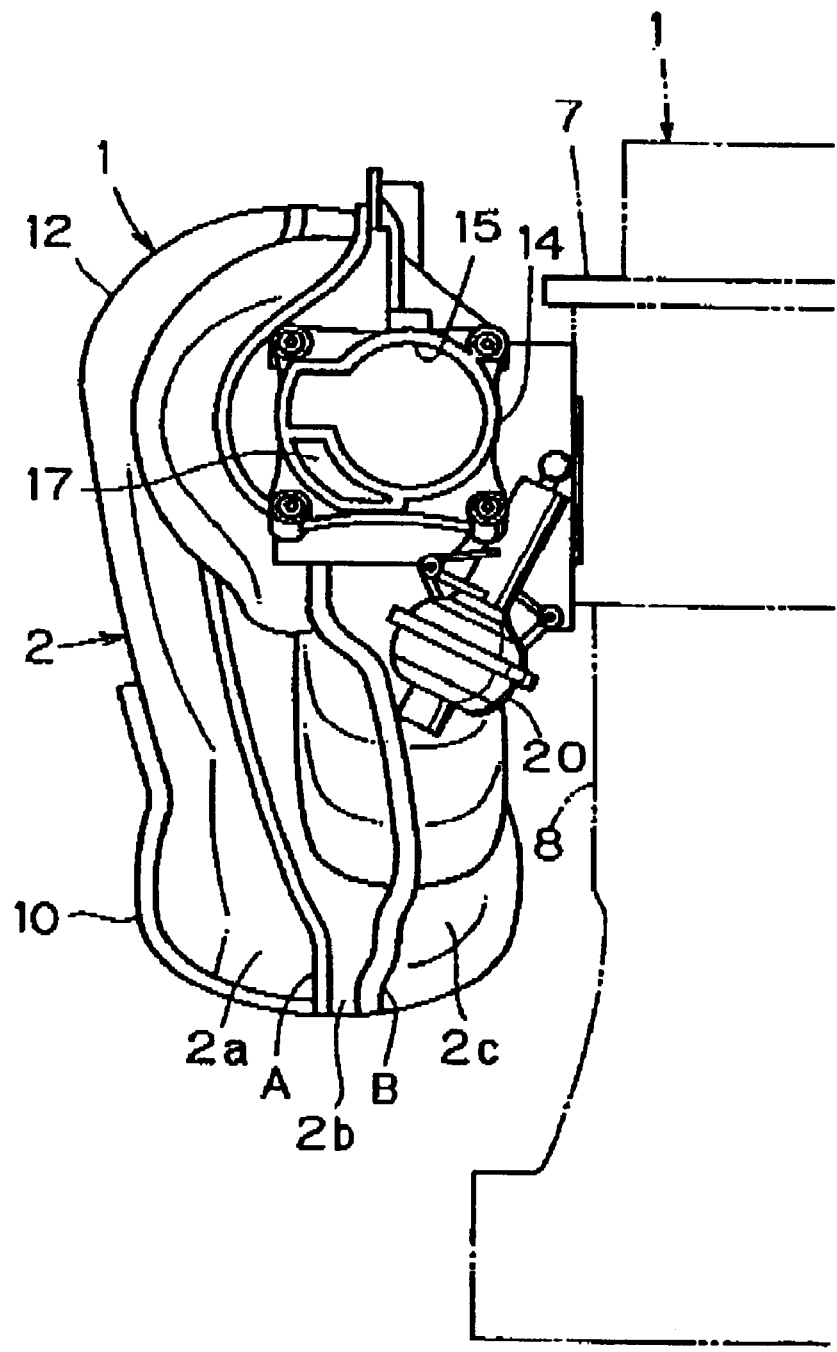
FIG. 2 is a side view of the intake manifold of FIG. 1.
Figure 3:
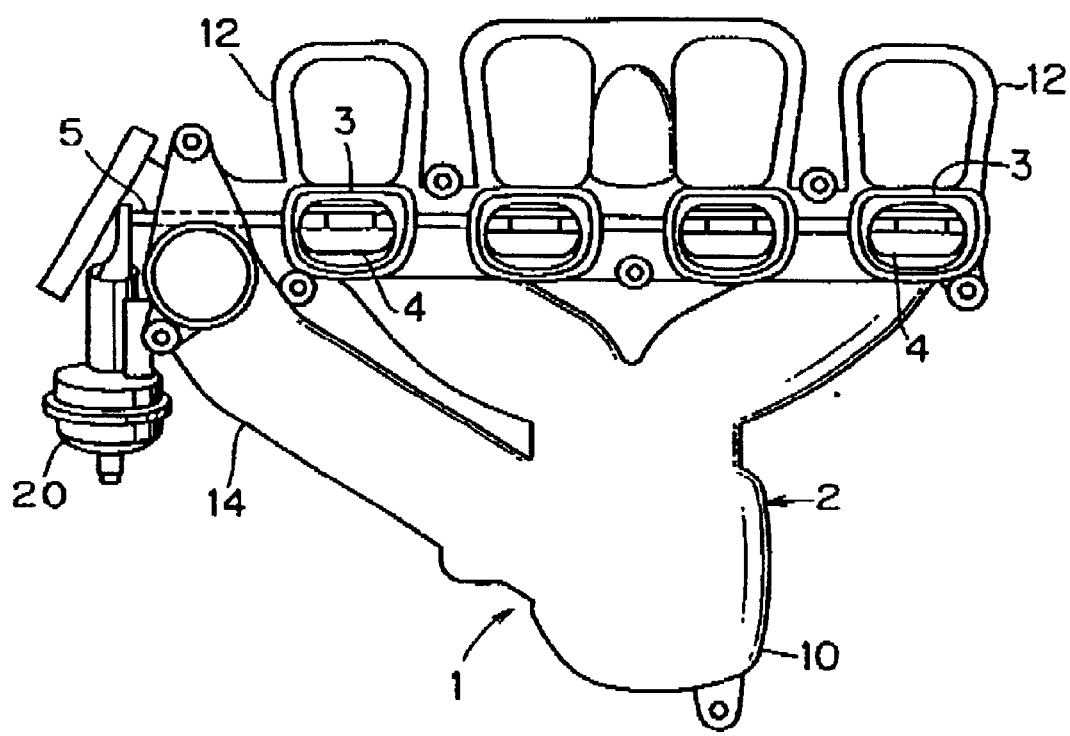
FIG. 3 is a rear view of the intake manifold of FIG. 1.

Referring to FIGS. 1 to 3, designated by the numeral 1 is an intake manifold of a vehicle engine according to an embodiment of the invention. The intake manifold 1 comprises a manifold body 2, frame members 3 fitted in downstream end portions of multiple intake passage sections 12 formed in the manifold body 2, and multiple on-off valves 4 joined to a common shaft 5 and located inside the individual frame members 3.

A downstream end of the intake manifold 1 is linked to a cylinder head 7 of an engine body 6 by bolted connection. The engine body 6 includes a cylinder block 8 having a plurality of cylinders and the cylinder head 7 mounted on top of the cylinder block 8. The engine body 6 shown in FIG. 1 has four cylinders and is installed crosswise with respect to the vehicle's center line. More specifically, the engine body 6 is installed in an engine room such that the cylinders are arranged parallel to the transversal direction of the vehicle, and the intake manifold 1 is installed ahead of the engine body 6.

The manifold body 2 includes a joint portion 10 in which a surge tank 11 is formed, the aforementioned multiple intake passage sections 12 (four in the illustrated example) which branch out from the joint portion 10 and form intake passages 13 connected to the respective cylinders of the engine body 6, and a common intake passage section 14 forming a common intake passage 15 upstream of the joint portion 10.

The aforementioned common intake passage section 14 extends obliquely upward from the joint portion 10 and a throttle body 16 incorporating a throttle valve (not shown) is connected to an upstream end of the common intake passage section 14. Further, part of an idle speed control (ISC) passage 17 for bypassing the throttle valve is integrally formed at the upstream end of the common intake passage section 14. An ISC valve 18 is mounted in the ISC passage 17.

The individual intake passage sections 12 also extend obliquely upward while fanning out leftward and rightward from the joint portion 10 and curve halfway. The intake passage sections 12 extend obliquely downward from their curved parts and the frame members 3 carrying the on-off valves 4 inside are fitted in the downstream end portions of the individual intake passage sections 12.

The shaft 5 linked to the on-off valves 4 extends across the individual intake passage sections 12 and an extreme end of the shaft 5 projects to one side of the intake manifold 1. This extreme end of the shaft 5 is connected to a negative-pressure-operated actuator 20. The aforementioned frame members 3, form inside walls of those portions of the intake passage sections 12 where the on-off valves 4 are located, support the on-off valves 4 and the shaft 5.

The manifold body 2 is made of a synthetic resin material, such as a polyamide resin, and constructed by welding three separate portions 2a, 2b, 2c (shown at left, middle and right as separated by lines A and B in FIG. 2) which are produced by injection molding.

A specific construction of portions where the frame members 3 and the multiple on-off valves 4 are equipped is now described in detail with reference to FIGS. 4 to 8.

Figure 4:
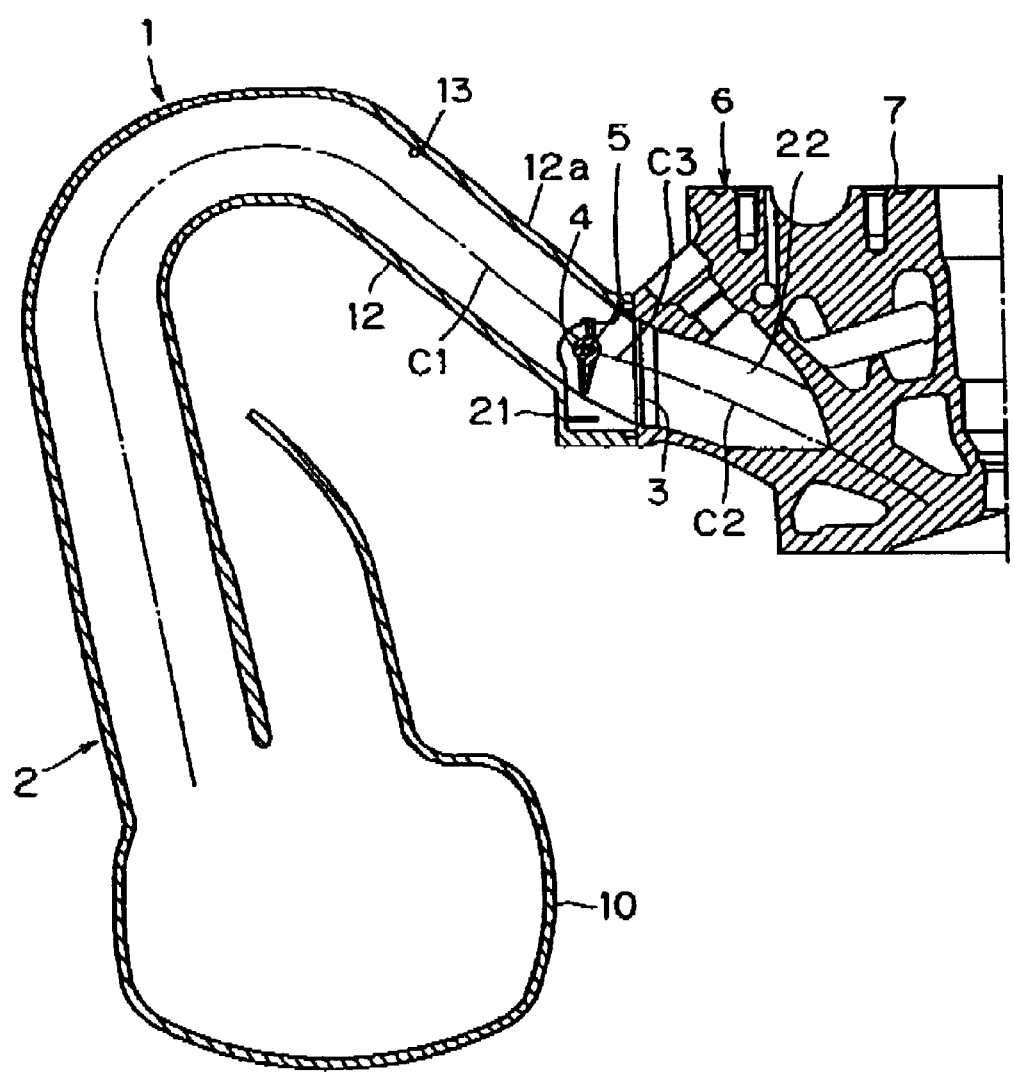
FIG. 4 is a fragmentary cross-sectional view of the intake manifold connected to an engine body.
Figure 5:
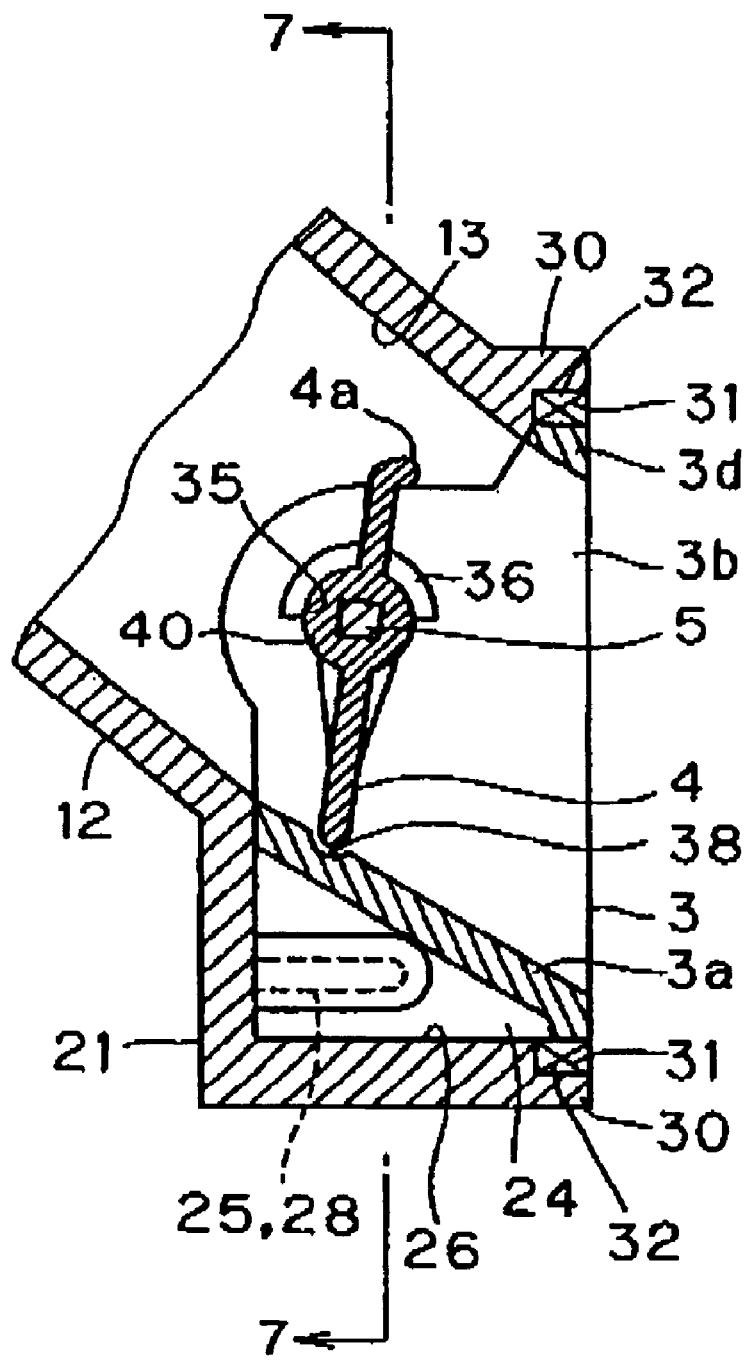
FIG. 5 is an enlarged fragmentary cross-sectional view taken along line 5—5 of FIG. 7 to show a downstream end portion of an intake passage fitted with a frame member, an on-off valve and a shaft.
Figure 6:
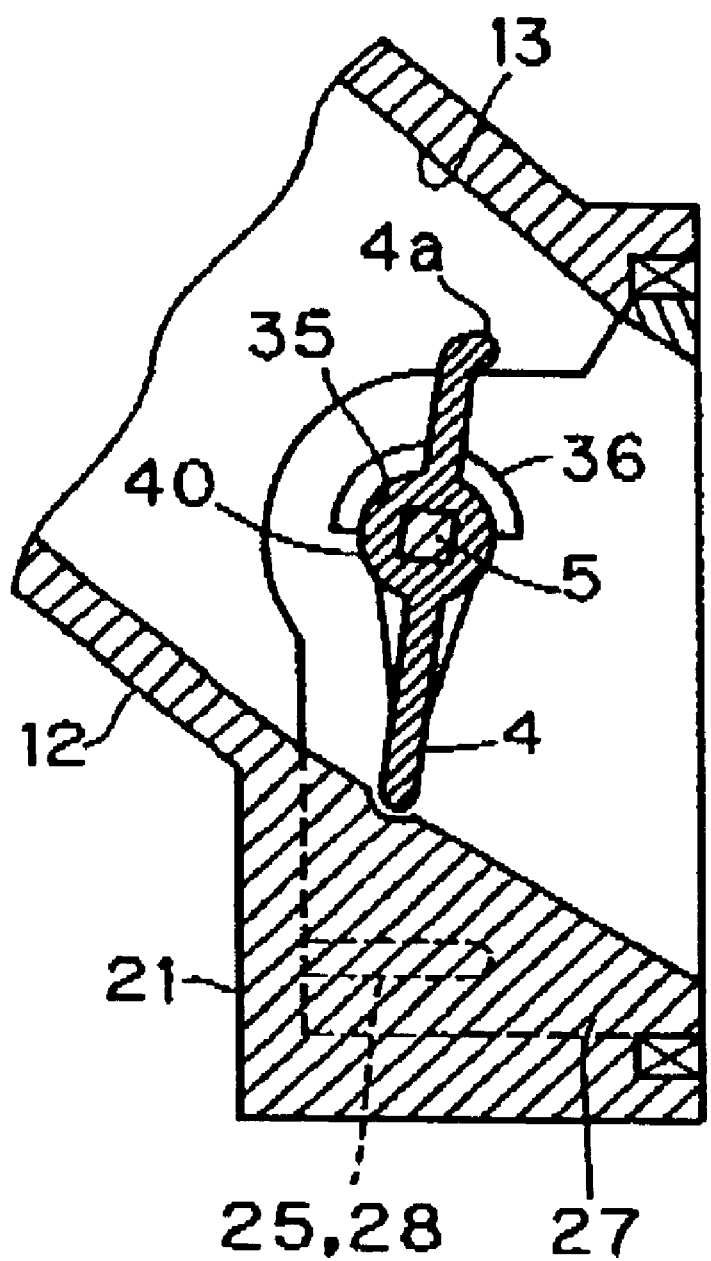
FIG. 6 is an enlarged fragmentary cross-sectional view taken along line 6—6 of FIG. 7.

As shown in FIGS. 4 to 6, there is formed a frame member housing space 21 opening sideways at the downstream end portion of each intake passage section 12 of the manifold body 2. The frame member housing space 21 has a shape corresponding to the external shape of the frame member 3 which is fitted in the frame member housing space 21. A specific downstream portion of the intake passage section 12 approximately from its halfway point to a point immediately adjacent to the frame member housing space 21 (in which the frame member 3 is fitted) is formed into a straight shape. When the intake passage section 12 is connected to the cylinder head 7 of the engine body 6, the inclination of axis line C1 of this straight portion 12a with respect to the horizontal plane differs from the inclination of axis line C2 of a relevant intake port 22 in the cylinder head 7 (i.e., the axis line of a corresponding intake passage in the engine body 6). Specifically, the angle of inclination of the axis line C1 is larger than the angle of inclination of the axis line C2.

Figure 7:
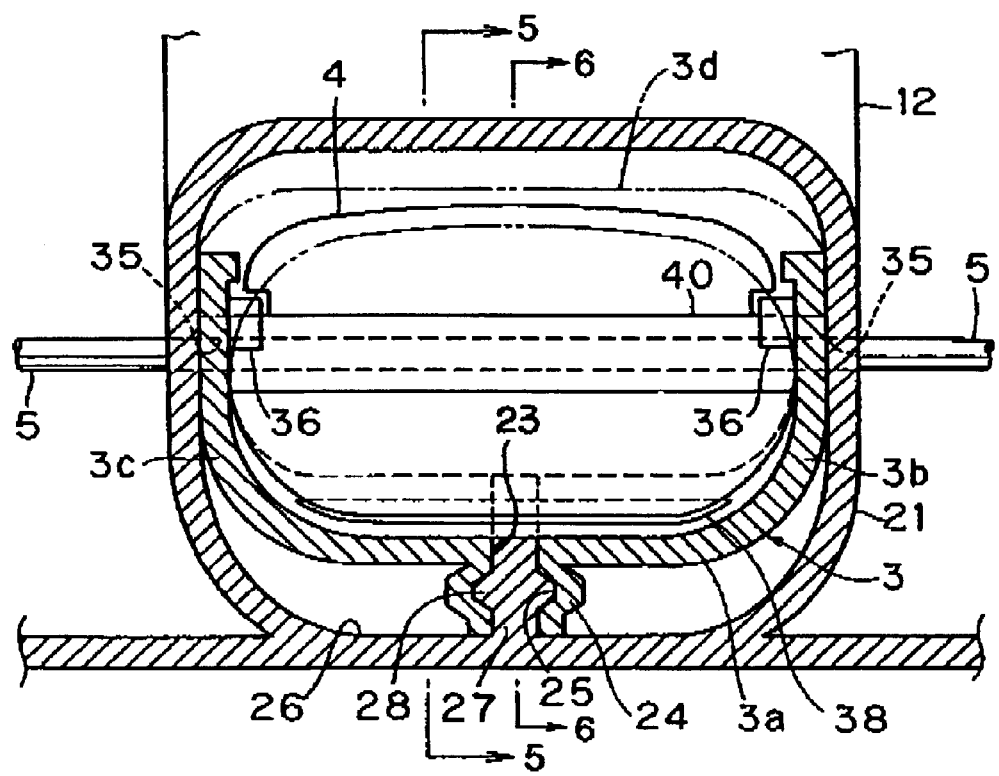
FIG. 7 is an enlarged cross-sectional view taken lines 7—7 of FIG. 5.
Figure 8:
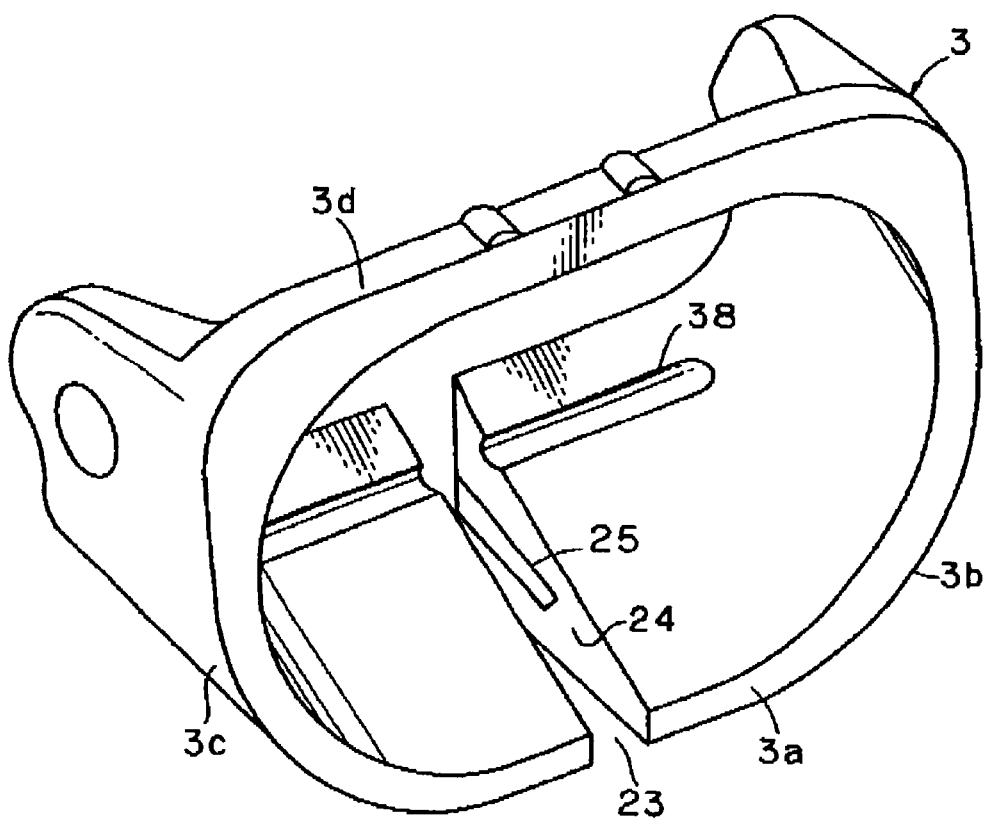
FIG. 8 is a perspective view of the frame member.

Referring to FIGS. 7 and 8, the frame member 3 has a lower wall 3a, left and right side walls 3b, 3c rising from both curved ends of the lower wall 3a, and a upper wall 3d of a narrow width connecting upper ends of the two side walls 3b, 3c to each other at the downstream end of the intake passage 13. The frame member 3 is a one-piece element produced by injection-molding a synthetic resin material. There is formed a cutout 23 in the middle of the lower wall 3a of the frame member 3 extending in a straight line along the intake passage axis line all across the lower wall 3a. This cutout 23 makes the frame member 3 elastically deformable, enabling its width to increase and decrease. As shown in FIGS. 7 and 8, the cutout 23 is flanked on both sides by protruding walls 24 swelling outward (downward) along the cutout 23.

The lower wall 3a has a slanted cross-sectional shape, the amount of projection of which decreases toward the downstream side of the intake passage 13. This means that the protruding walls 24 are shaped such that the amount of their downward projection which is large at their upstream side decreases toward their downstream side. As shown in FIG. 8, there is formed a straight U-shaped groove 25 extending generally in a horizontal direction in an inside surface of each protruding wall 24 along a specific length from its upstream end.

On the other hand, there is formed a recessed part 26 for accommodating the two protruding walls 24 at the bottom of each frame member housing space 21 of the manifold body 2. At the middle of the width of this recessed part 26, there is formed an upward-projecting guide rail 27 which fits in the aforementioned cutout 23, and a pair of elongated projections 28 which fit in the aforementioned U-shaped groove 25 are formed on both side surfaces of the guide rail 27.

As can be seen from FIG. 4, the frame member 3 and the frame member housing space 21 are shaped such that when the frame member 3 is fitted in the frame member housing space 21 of the intake passage section 12, the protruding walls 24 are accommodated in the recessed part 26 of the frame member housing space 21, whereby an upper surface of the guide rail 27 fitted in the cutout 23 between the two protruding walls 24 becomes flush with an upper surface of the lower wall 3a of the frame member 3, the individual walls 3a–3d of the frame member 3 form an inside surface connected smoothly to an inside surface of the intake passage section 12 upstream of the frame member housing space 21, and intake passage axis line C3 of the frame member 3 has an inclination that smoothly connects the axis line C1 of the straight portion 12a of the intake passage section 12 and the axis line C2 of the intake port 22 of the cylinder head 7.

When the manifold body 2 is connected to the cylinder head 7 of the engine body 6, downstream end surfaces of the intake passage sections 12 of the manifold body 2 and those of the frame members 3 fitted in the respective intake passage sections 12 go into contact with those areas of a wall surface of the cylinder head 7 that are around the intake ports 22. To ensure sealing performance of those contact areas, there is formed a stepped peripheral edge 30 at the downstream end of each intake passage section 12, the inner periphery of the stepped peripheral edge 30 being larger than the outer periphery of the downstream end of the frame member 3 by a specific amount. This stepped peripheral edge 30 and an outer peripheral surface of the frame member 3 together form a seal groove 31, in which a seal member 32 is fitted.

In the middle of each side wall 3c of the frame member 3, there are formed a through hole 35 which serves as a bearing for supporting a later-described journal portion 40 of the on-off valve 4 as well as an inward-projecting boss 36. Each boss 36 has generally a semilunar shape extending in an arc-shaped form along and beyond an upper half peripheral edge of the through hole 35. There are also formed shaft holes (not shown) in both sides of each intake passage section 12 of the manifold body 2 at positions corresponding to the through holes 35 in the in the side walls 3c of the frame member 3.

Further, there are formed grooves 38 having an arciform cross-sectional shape in an upper surface of the lower wall 3a of the frame member 3 at positions corresponding to the position of a lower edge of the on-off valve 4 as it is closed, the arciform cross-sectional shape of the grooves 38 matching the path of the lower edge of the swinging on-off valve 4.

The on-off valve 4 which is placed inside the frame member 3 has the aforementioned journal portion 40 integrally formed on the on-off valve 4. The journal portion 40 has a longitudinal through hole which allows the shaft 5 to pass through and is supported by the through holes 35 (bearings). In the present embodiment, the shaft 5 has a square cross-sectional shape. The journal portion 40 formed on the on-off valve 4 has a cylindrical external shape and extends in a direction generally perpendicular to the intake passage axis line, whereas the through hole made in the journal portion 40 has a square cross-sectional shape. The journal portion 40 thus configured is supported by the through holes 35 and the bosses 36 of the frame member 3.

In this embodiment, the on-off valve 4 is closed under low-load conditions, for example, to increase intake flow velocity in order that a tumble can be produced in a combustion chamber. More specifically, the on-off valve 4 is constructed such that the lower half of the on-off valve 4 goes into substantially close contact with inside surfaces of the lower wall 3a and two side walls 3b, 3c of the frame member 3 and a specific amount of gap is created between an upper edge portion 4a of the on-off valve 4 and the inside surface of the intake passage 13 to allow the passage of intake gas flow when the on-off valve 4 is closed. To ensure smooth intake gas flow, the upper edge portion 4a of the on-off valve 4 curves in a direction which becomes downstream when the on-off valve 4 is closed.

The intake manifold 1 having the above-described construction can be easily formed and assembled.

Specifically, the manifold body 2 can be easily formed by injection-molding the three separate portions 2a, 2b, 2c and then welding them into a single structure as stated earlier. While the manifold body 2 is constructed in this way, each of the frame members 3 which supports the shaft 5 and constitutes a downstream portion of the inside wall of each intake passage section 12 where the on-off valve 4 is provided is formed as a separate element, and the frame member housing space 21 in which the frame member 3 can be fitted is formed in the downstream portion of each intake passage section 12 of the manifold body 2, the frame member housing space 21 opening sideways. The downstream portion of each intake passage section 12 can therefore be designed into a shape which facilitates removal from dies in injection molding operation. In addition, since the frame member 3 also has a simple structure, its molding is easy.

The frame members 3 and the on-off valves 4 are assembled into the manifold body 2 as follows. First, each on-off valve 4 is fitted in the frame member 3, in which the journal portion 40 integrally formed on the on-off valve 4 is fitted into the through holes 35 and the bosses 36 of the frame member 3. Since the frame member 3 can be expanded and compressed by elastic deformation due to the provision of the cutout 23, it is easy to insert the journal portion 40 of the on-off valve 4 into the through holes 35 and the bosses 36. Also, since the inward-projecting bosses 36 having generally a semilunar shape are provided on the inside surfaces of the side walls 3b, 3c of the frame member 3, it is even easier to fit the on-off valve 4 in the frame member 3 and the bosses 36 provide surfaces for stopping the journal portion 40 of the on-off valve 4 if the journal portion 40 is fitted from the underside (as illustrated in FIG. 5) of the through holes 35 where the bosses 36 do not exist.

When the on-off valves 4 have been fitted in the respective frame members 3 in the aforementioned manner, the on-off valves 4 are rotatably supported by the frame members 3. Next, the frame members 3 carrying the on-off valves 4 are placed in the frame member housing spaces 21 provided at the downstream end portions of the individual intake passage sections 12 of the manifold body 2 as follows. Specifically, when the protruding walls 24 provided on both sides of the cutout 23 in each frame member 3 are placed in the recessed part 26 of the frame member housing space 21, the guide rail 27 provided in the recessed part 26 fits in the cutout 23 and the projections 28 on both side surfaces of the guide rail 27 fit in the U-shaped grooves 25 formed in the inside walls of the protruding walls 24, whereby the frame member 3 is properly positioned in the frame member housing space 21. As the frame members 3 are positioned in this fashion and can be expanded and compressed to a certain degree by elastic deformation due to the provision of the cutout 23, the frame members 3 and the on-off valves 4 can be easily assembled into the manifold body 2.

While the aforementioned protruding walls 24 which fit on the guide rail 27 primarily serve to position the frame member 3 in the frame member housing space 21, they also help increase the stiffness of the frame member 3.

After the frame members 3 and the on-off valves 4 have been assembled into the manifold body 2, the shaft 5 is inserted into the manifold body 2 from its one side in such a way that the shaft 5 passes through the downstream end portions of the individual intake passage sections 12, and thus through the journal portions 40 of the individual on-off valves 4. Since the shaft 5 and the through hole in the journal portion 40 of each on-off valve 4 have a square cross-sectional shape, the shaft 5 and the on-off valves 4 are joined together in a manner that they turn together in a reliable fashion if only the shaft 5 is passed through the journal portions 40 of the individual on-off valves 4. The actuator 20 is then connected to the extreme end of the shaft 5.

The frame members 3, the on-off valves 4, the shaft 5 and associated elements are easily assembled into the manifold body 2 in the aforementioned manner. After assembly, the shaft 5 and the journal portions 40 of the on-off valves 4 are rotatably supported by the through holes 35 and the bosses 36 of the on-off valves 4. Since the shaft 5 is not securely held by supporting frames as in the conventional structure of the earlier-mentioned Japanese Unexamined Patent Publication No. 6-240123, it is possible to decrease resistance to rotation of the shaft 5.

The above-described structure of the present embodiment also provides the following operational effects.

Since the specific downstream portion of the intake passage section 12 is formed into a straight shape, it is possible to facilitate removal of this portion from dies in injection molding operation. It is also possible to increase the degree of freedom of design with respect to the length of each intake passage 13, for instance, by making the inclination of the axis line C1 of the straight portion 12a to differ from the inclination of the axis line C3 of each intake port 22 in the cylinder head 7. If the inclination of the axis line C1 of the straight portion 12a of the intake passage section 12 is made larger than the inclination of the axis line C3 of the intake port 22, for example, it is possible to increase the length of the intake passage 13 without increasing the size of the intake manifold 1 in its forward and rearward directions ahead of the engine body 6.

Since smooth intake gas flow is impeded when the direction of the intake gas flow suddenly changes between the downstream end of the intake passage 13 and the intake port 22 if the axis line C1 of the straight portion 12a of the intake passage section 12 differs from the axle line C3 of the intake port 22, it is desirable that gradually vary the axis line of the intake passage 13 near its downstream end. If the downstream end portion of the intake passage section 12 is formed in that fashion, however, it becomes difficult to remove dies from that portion of the intake passage section 12.

In contrast, the inclination of the passage axis line C3 of the frame member 3 is such that the axis line C3 smoothly connects between the axis line C1 of the straight portion 12a of the intake passage section 12 and the axis line C2 of the intake port 22 of the cylinder head 7 in this embodiment, so that it is possible to avoid a sudden change in the direction of the intake gas flow between the downstream end of the intake passage 13 and the intake port 22 and thereby ensure smooth intake gas flow while making the inclination of the axis line C1 of the straight portion 12a to differ from the inclination of the axis line C3 of the intake port 22 to ensure the degree of freedom of design, for instance, and ensuring ease of molding operation of the manifold body 2.

Furthermore, since the stepped peripheral edge 30 is provided at the downstream end of the intake passage section 12 and the seal groove 31 is formed by the stepped peripheral edge 30 and the outer peripheral surface of the frame member 3, good sealing performance of the intake passage 13 is ensured by a simple structure when the intake manifold 1 is joined to the engine body 6.

Moreover, since the grooves 38 having an arciform cross-sectional shape matching the path of the lower edge of the swinging on-off valve 4 are formed in the upper surface of the lower wall 3a of the frame member 3, it is possible to reduce variations in the clearance between the lower edge of the on-off valve 4 and the upper surface of the lower wall 3a of the frame member 3 when the on-off valve 4 is closed, More specifically, it is required that the aforementioned clearance be sufficiently small when the on-off valve 4 is closed for creating a tumble. While the closed position of the on-off valve 4 is determined by a stopper provided at the extreme end of the shaft 5, for example, small variations could occur in the angle of the on-off valve 4 at its closed position due to manufacturing errors, and if the upper surface of the lower wall 3a is flat, variations would occur in the amount of clearance between the lower edge of the on-off valve 4 and the upper surface of the lower wall 3a as a result of the variations in the angle of the closed on-off valve 4. Since the grooves 38 in the upper surface of the lower wall 3a of the frame member 3 have an arciform cross-sectional shape in the present embodiment, it is possible to keep the aforementioned clearance to a generally constant small amount even if the angle of the on-off valve 4 at its closed position varies within the arciform surface area of the grooves 38.

Although a tumble is produced when the on-off valve 4 is closed in the foregoing embodiment, the intake manifold 1 may be constructed such that a swirl is produced when the on-off valve 4 is closed by making a cutout at one side of the on-off valve 4, for example. Also, the construction of any part of the intake manifold 1 of the embodiment may be modified as long as such modification falls within the scope of the invention.

The intake manifold 1 may be further associated with ancillary devices. These ancillary devices may include a passage for blowby gas and an oil separator incorporated in the blowby gas passage which are provided between the intake manifold 1 and the engine body 6, as well as an exhaust gas recirculation (EGR) passage and a bypass passage connected to an upstream end portion of the intake manifold 1. Now, another preferred embodiment of the invention employing these ancillary devices is described below.

Figure 9:
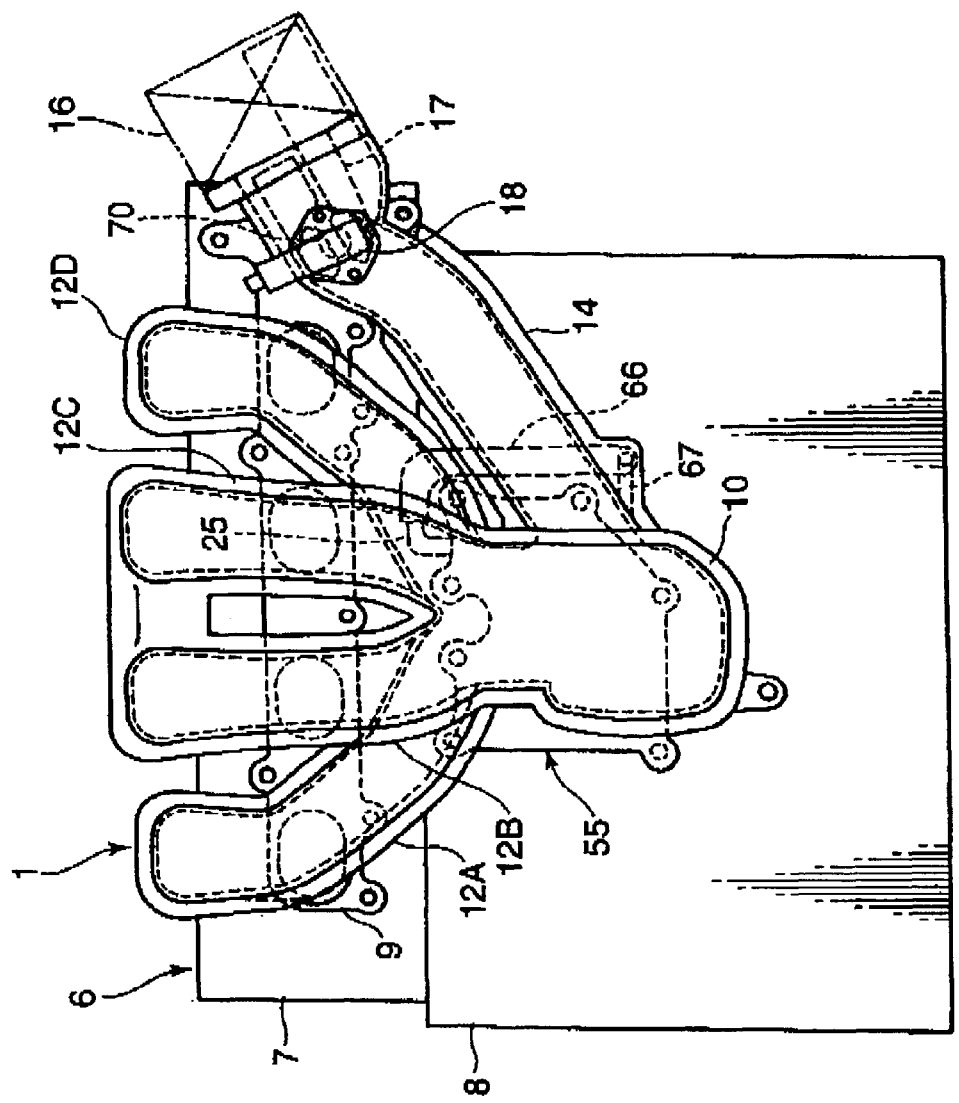
FIG. 9 is a front view showing a specific example of an intake structure of an engine comprising an intake manifold and a blowby gas passage.
Figure 10:
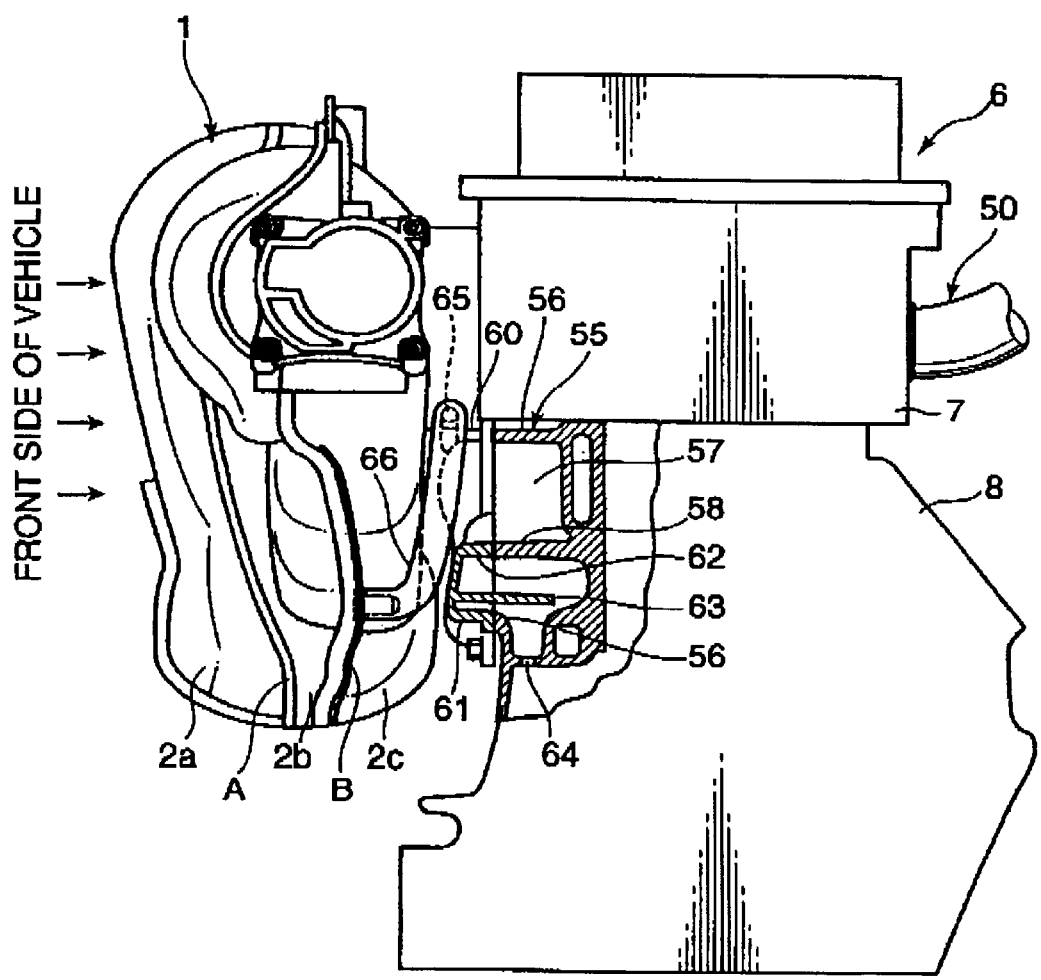
FIG. 10 is a side view of the intake structure.
Figure 11:
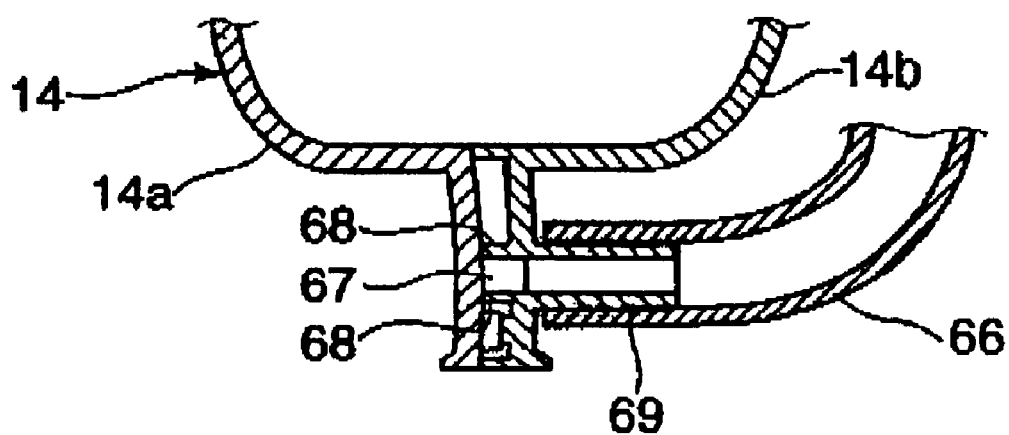
FIG. 11 is a cross-sectional view of a part where a positive crankcase ventilation (PCV) hose is joined to the intake manifold of FIG. 9.
Figure 12:
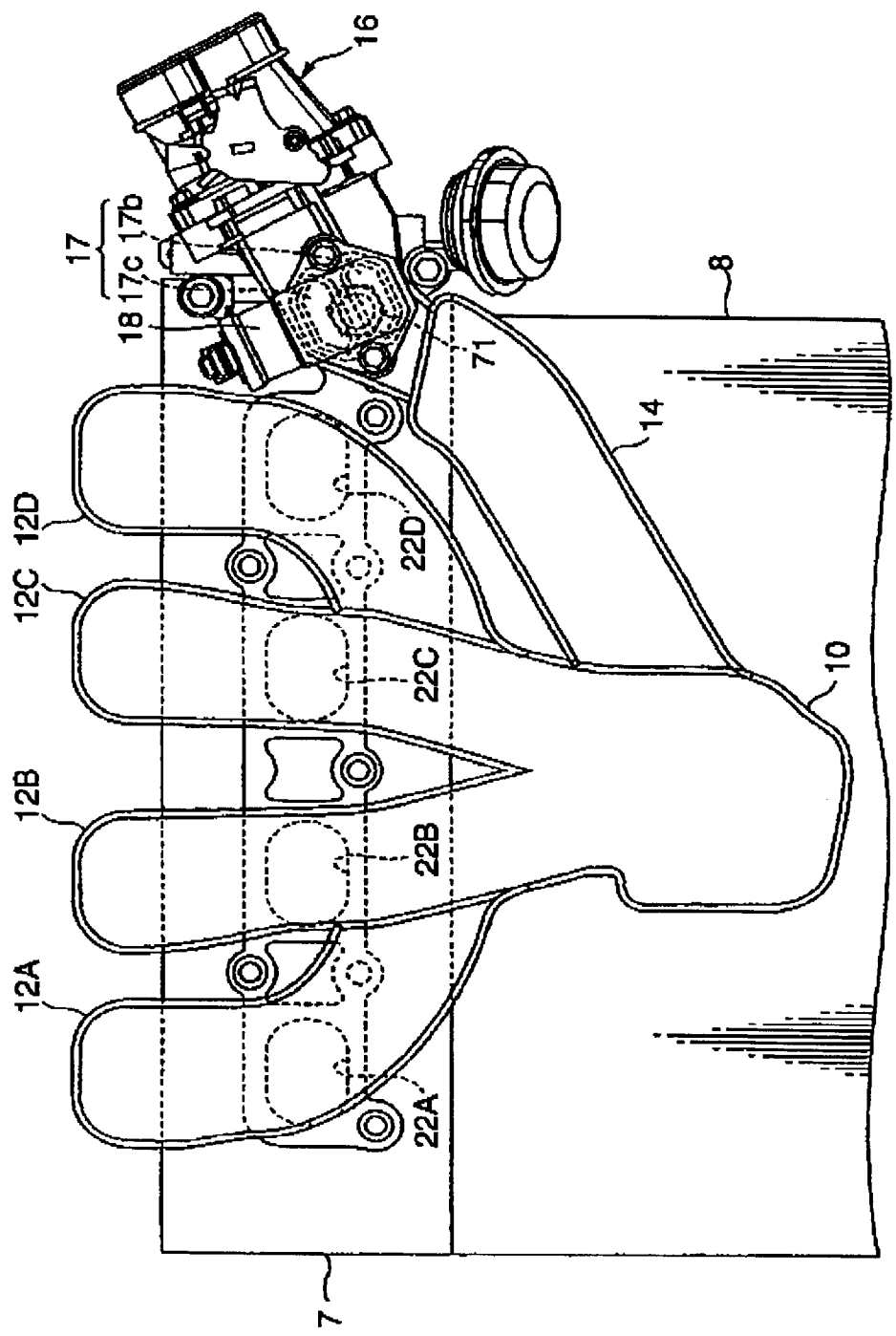
FIG. 12 is a front view showing an example of the construction of an intake manifold including an exhaust gas recirculation (EGR) passage joint and an idle speed control (ISC) valve assembly portion.
Figure 13:
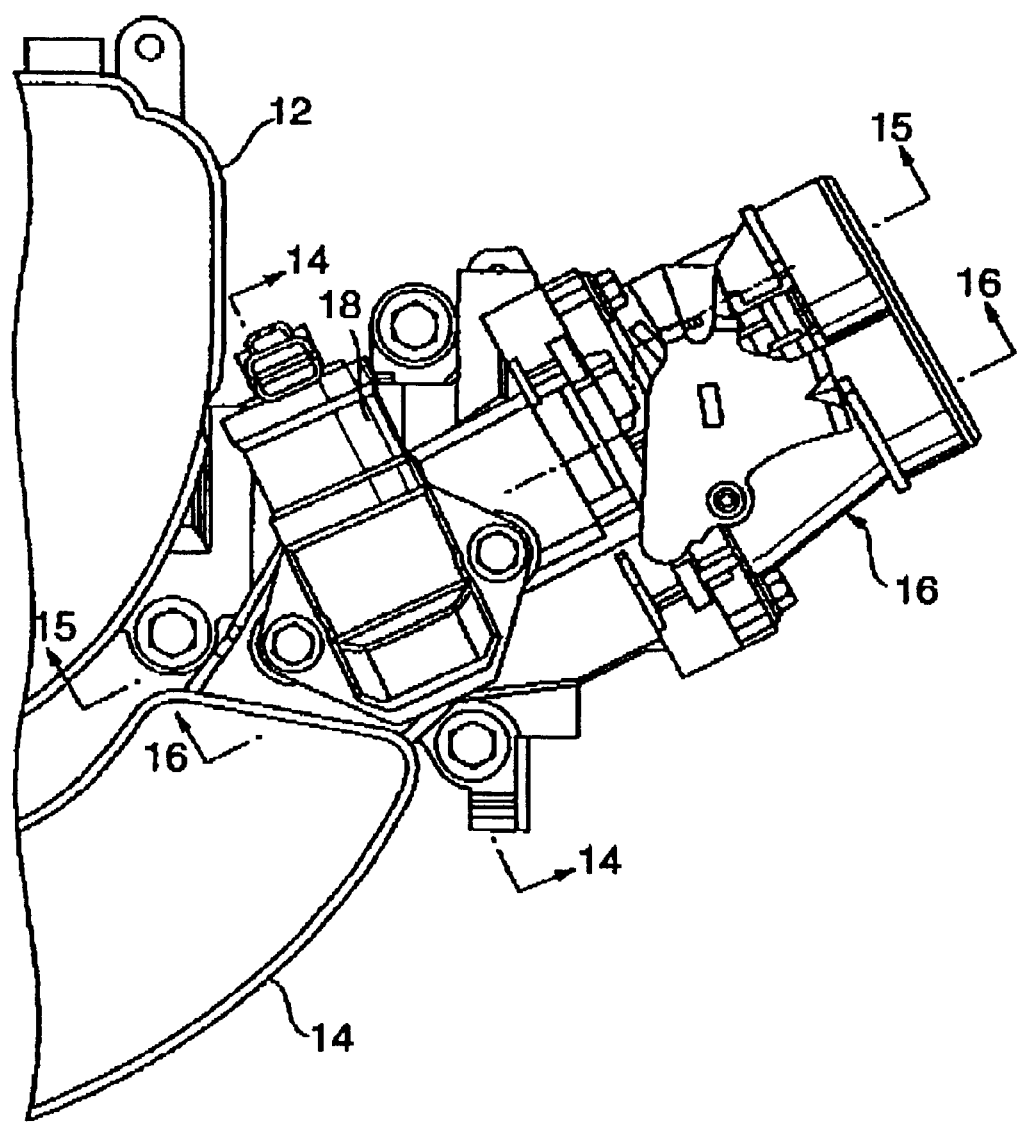
FIG. 13 is an enlarged view particularly showing the construction of a portion of the intake manifold of FIG. 12 immediately downstream of a throttle body.
Figure 14:
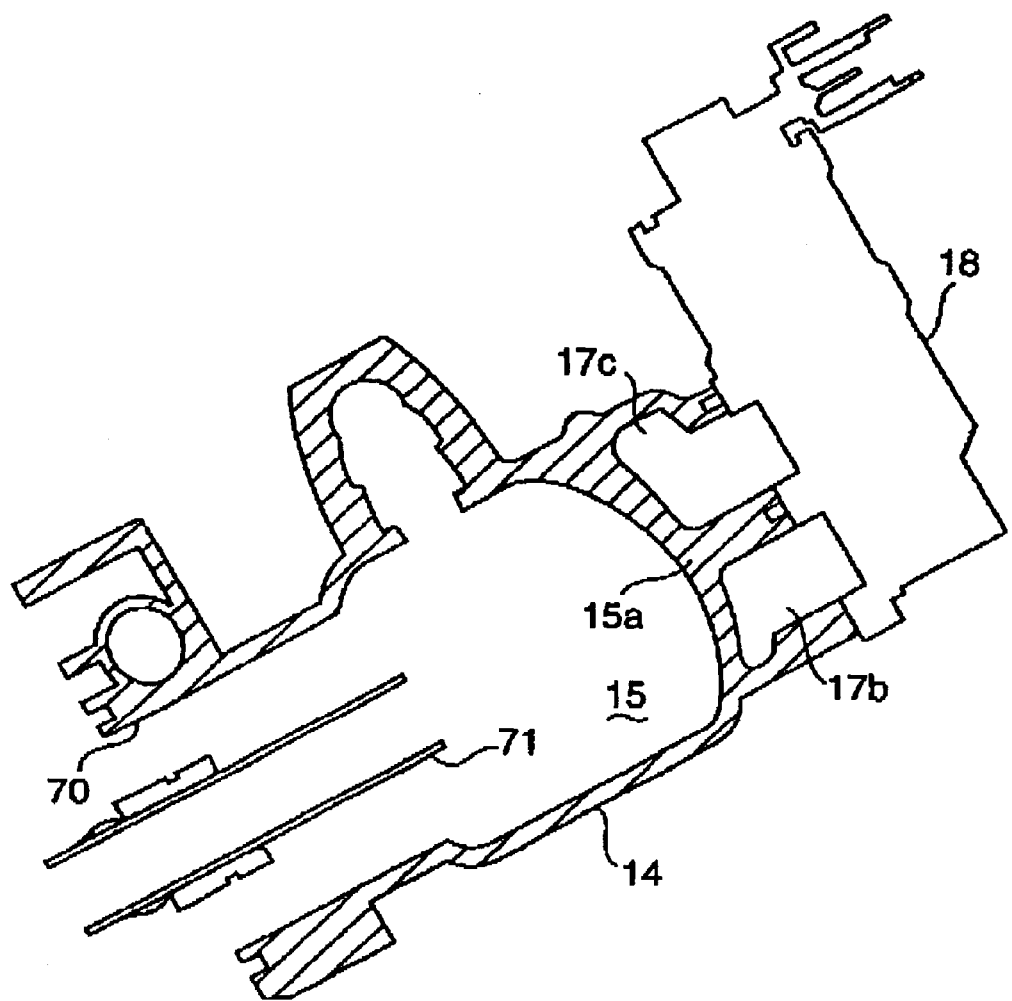
FIG. 14 is a cross-sectional view taken along line 14—14 of FIG. 13.
Figure 15:
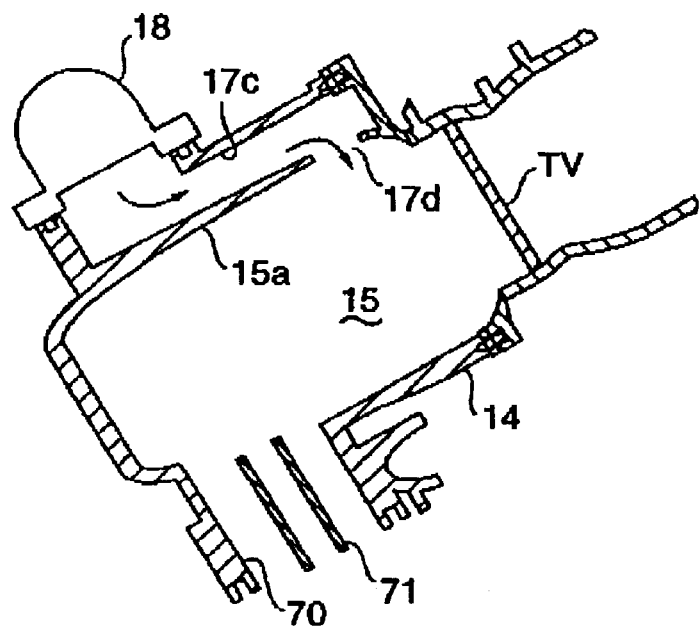
FIG. 15 is a cross-sectional view taken along line 15—15 of FIG. 13.
Figure 16:
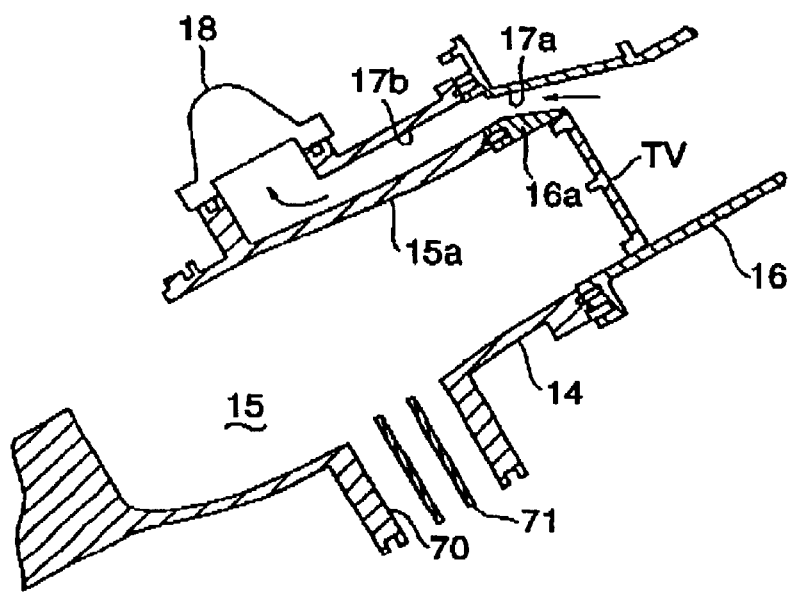
FIG. 16 is a cross-sectional view taken along line 16—16 of FIG. 13.
Figure 17:
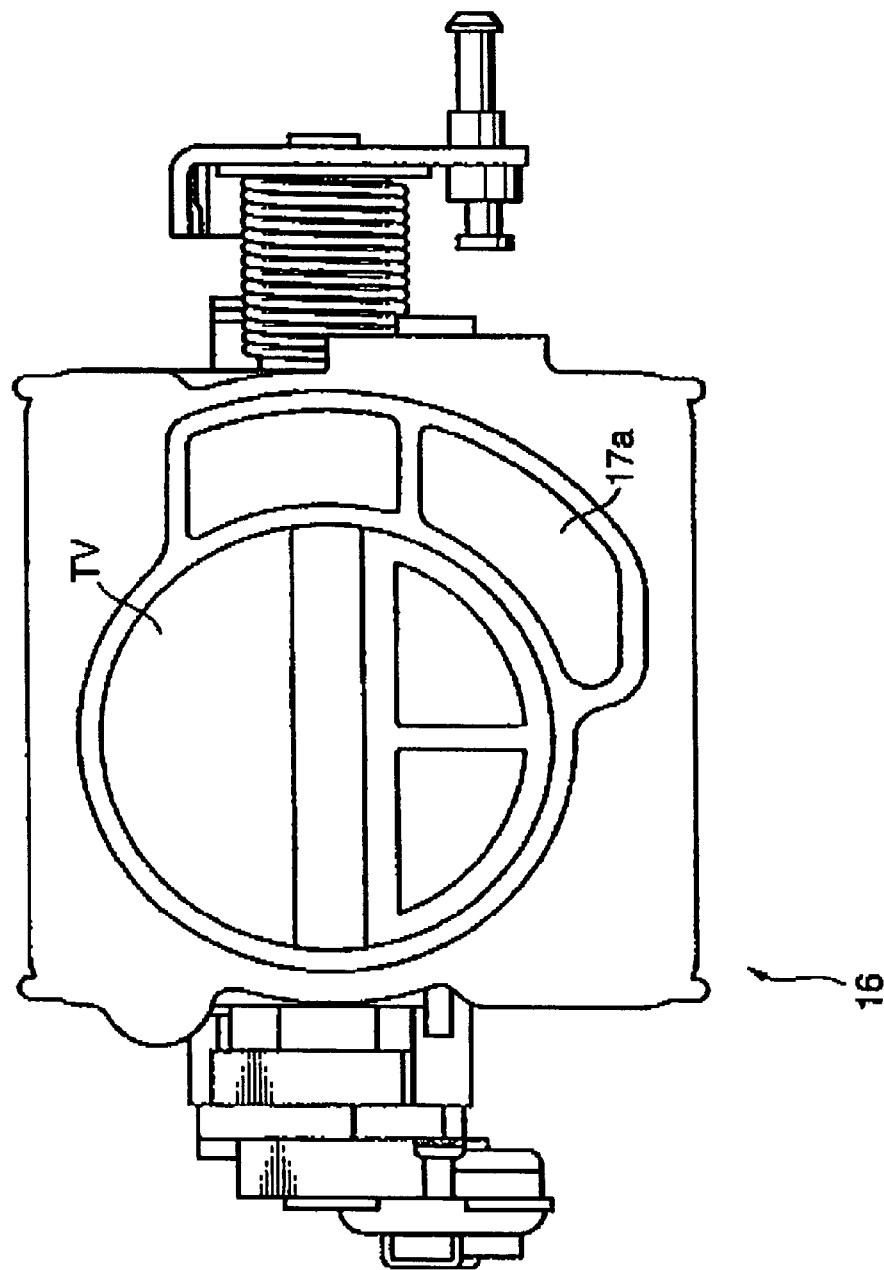
FIG. 17 is a diagram particularly showing the throttle body of the intake manifold of FIG. 12 as viewed from a downstream end of the throttle body.
Figure 18:
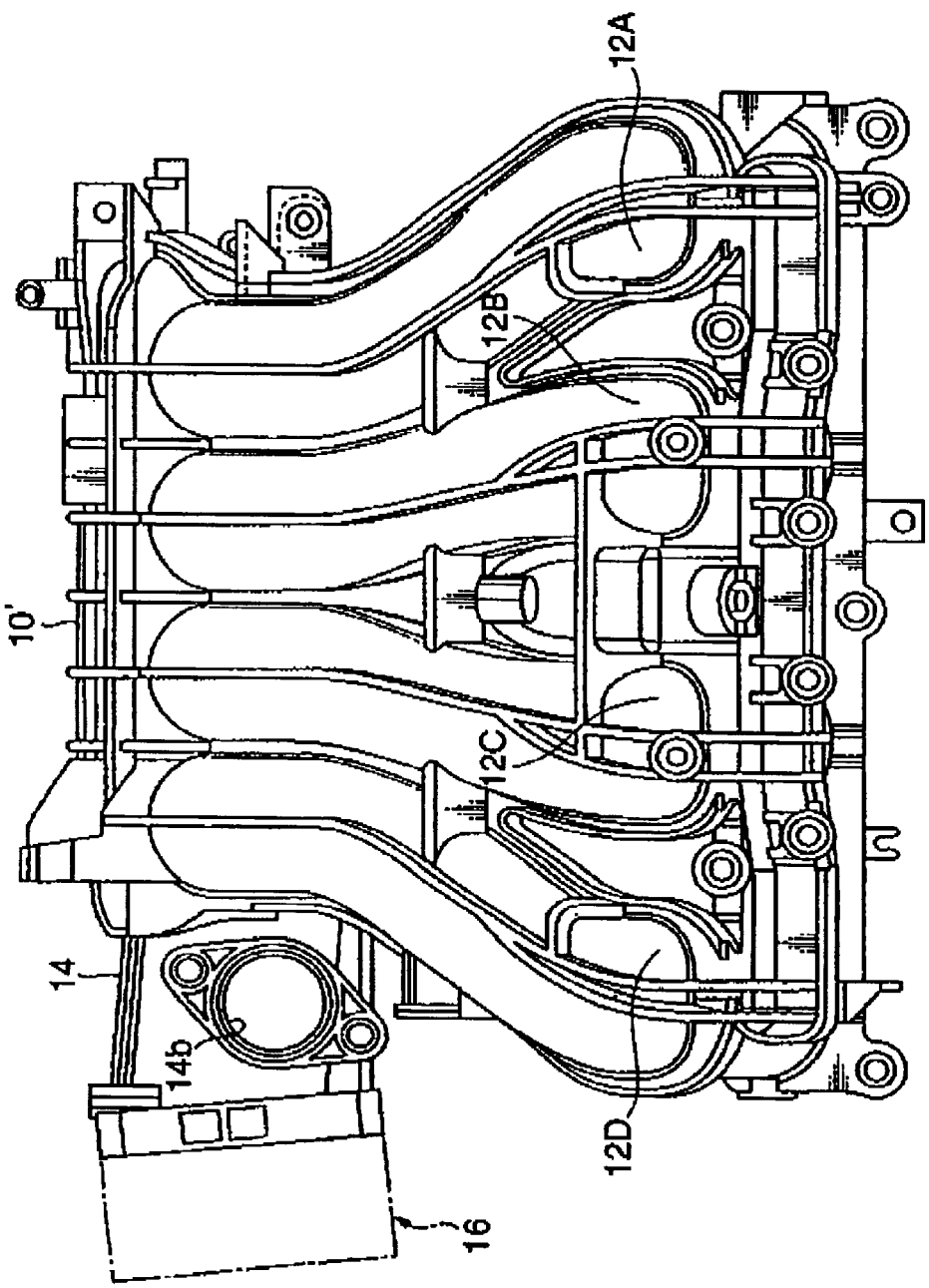
FIG. 18 is a front view showing another example of the construction of an intake manifold.
Figure 19:
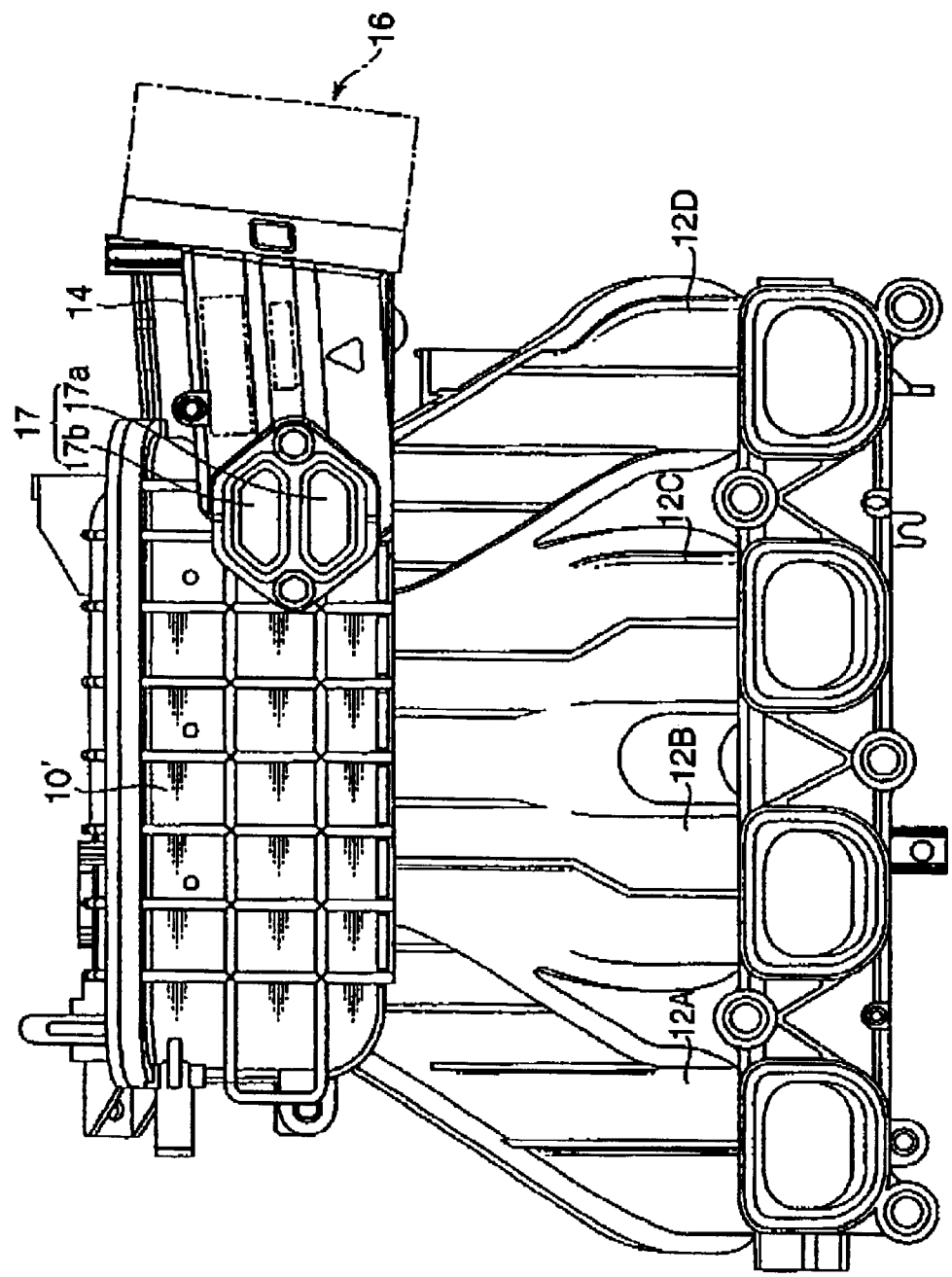
FIG. 19 is a rear view of the intake manifold of FIG. 18.
Figure 20:
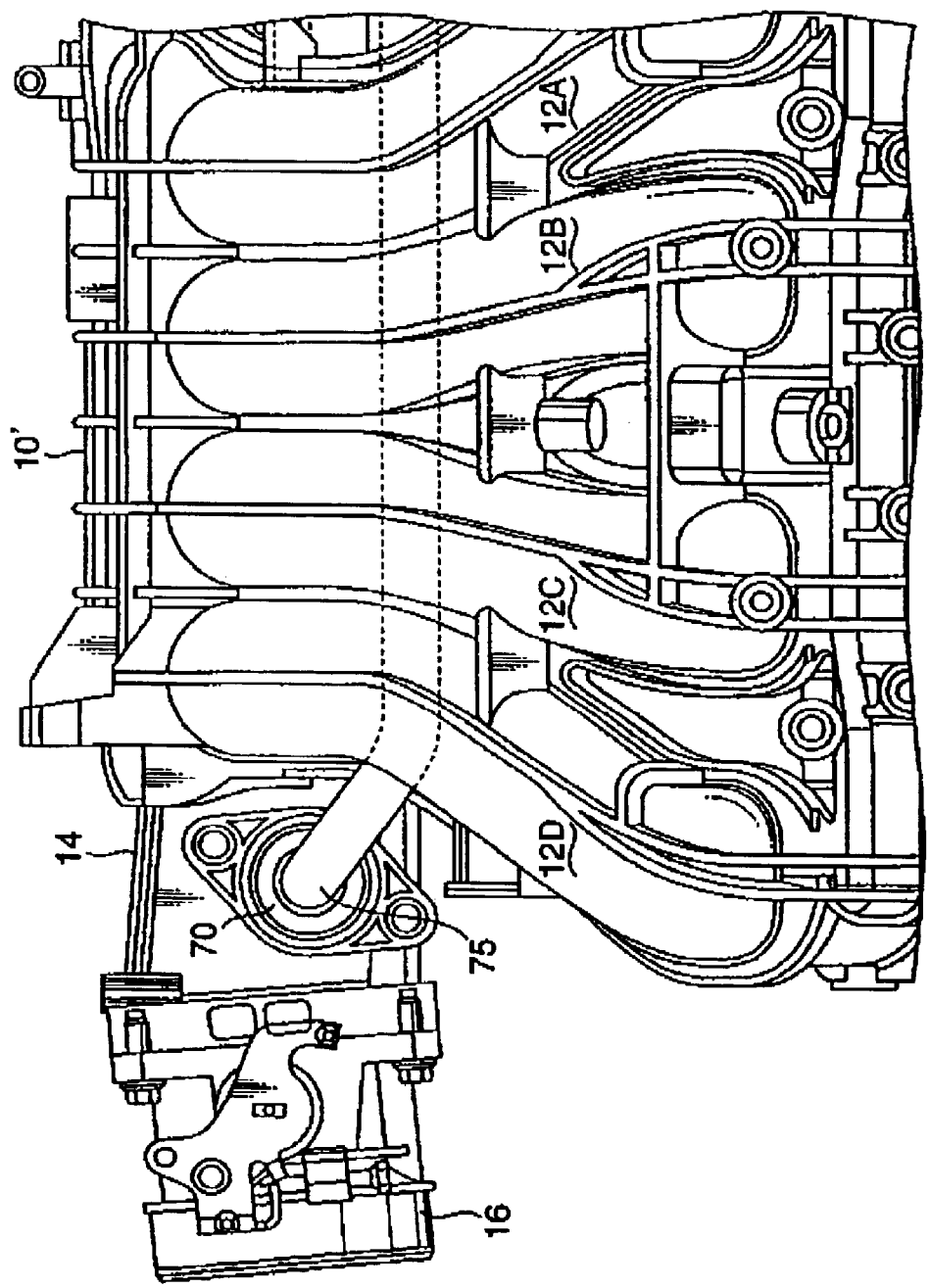
FIG. 20 is an enlarged view particularly showing the construction of the intake manifold of FIG. 18 downstream of a throttle body.
Figure 21:
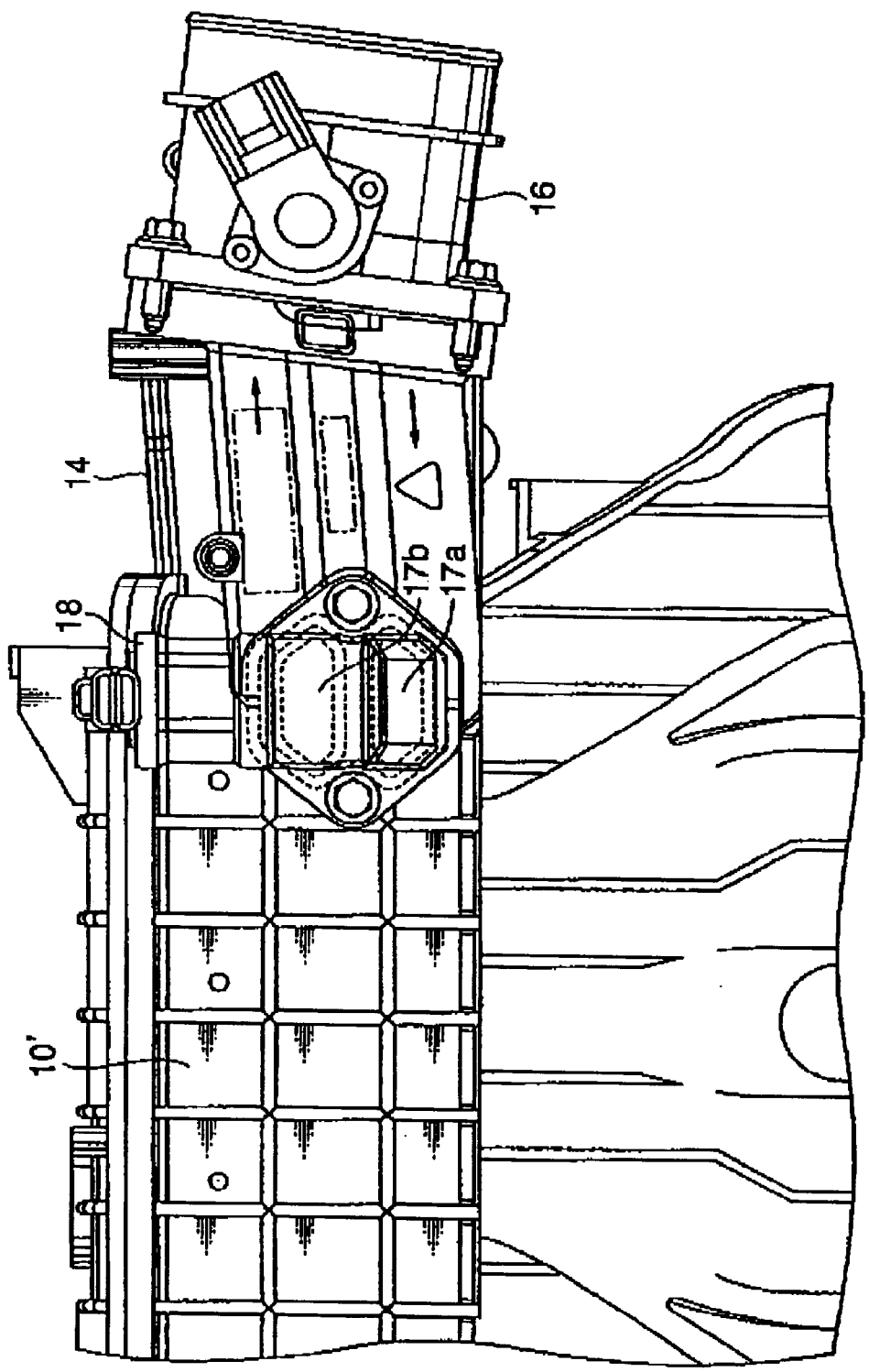
FIG. 21 is an enlarged view particularly showing the construction of the intake manifold of FIG. 19 downstream of a throttle body.
Figure 22:
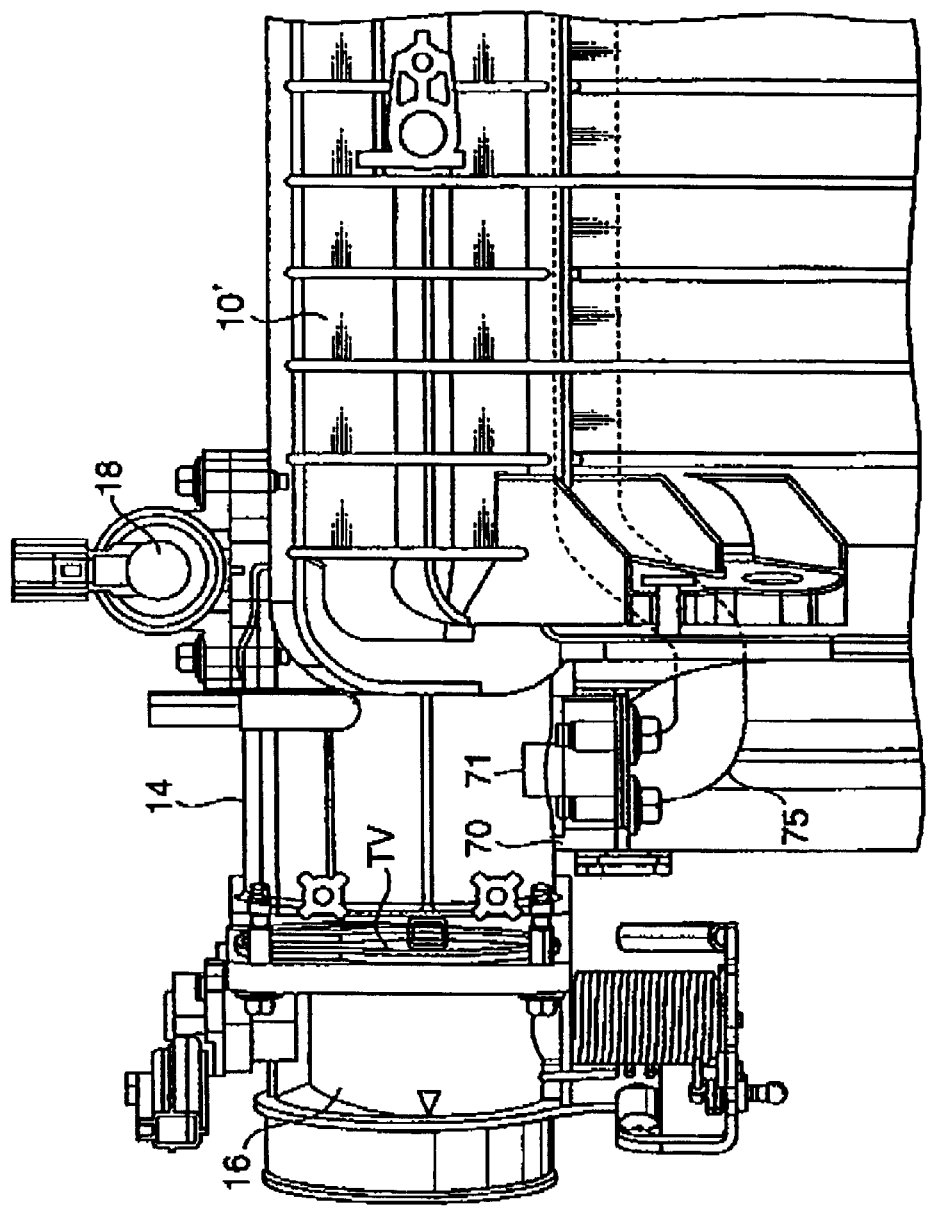
FIG. 22 is an enlarged plan view particularly showing the construction of the intake manifold of FIG. 16 downstream of a throttle body.

FIGS. 9 to 11 show an example of a preferred arrangement of a blowby gas passage and an oil separator chamber 55 in a vehicle engine.

The engine shown in these Figures is also an in-line four-cylinder engine of which engine body 6 is installed crosswise with respect to the vehicle's center line in an engine room in a forward part of the vehicle. An exhaust manifold 50 is provided on the rear side of the engine body 6 while the intake manifold 1 is provided on the front side of the engine body 6. The intake manifold 1 has basically the same structure as shown in FIG. 1. Specifically, the intake manifold 1 comprises a joint portion 10, a plurality (four in the illustrated example) of branching pipes (intake passage sections) 12A, 12B, 12C, 12D which branch out from the joint portion 10 and are connected to individual cylinders of the engine body 6, forming intake passages, and a common intake passage section 14 located upstream of the joint portion 10, wherein the joint portion 10 is located at a lower position and the branching pipes 12A–12D and the common intake passage section 14 extend upward from the joint portion 10. As a flange member 9 connected to downstream ends of the branching pipes 12A–12D is bolted to a cylinder head 7 in this structure, the intake manifold 1 is connected to the engine body 6.

The length of the joint portion 10 in the direction of the row of the cylinders is made approximately equal to the height of the joint portion 10. This means that the joint portion 10 does not constitute a large-sized surge tank extending over a great length in the in the direction of the row of the cylinders but is rather compactly shaped in that direction. The individual branching pipes 12A–12D extend obliquely upward while fanning out leftward and rightward from the joint portion 10. These branching pipes 12A–12D are arranged such that upstream portions of the central branching pipes 12B, 12C partly overlap upstream portions of the branching pipes 12A, 12D on both sides near the joint portion 10 in front view and, therefore, the upstream portions of the branching pipes 12A–12D look as if they are joined together when viewed from the front of the vehicle.

The oil separator chamber 55 for separating oil from blowby gas is provided between the engine body 6 and the intake manifold 1.

In the illustrated example, the oil separator chamber 55 includes a framework structure 56 provided on a side surface of a cylinder block 8 on the vehicle's front side and a cover 60 fixed to the front side of the framework structure 56. More specifically, the framework structure 56 having four (top, bottom, left ad right) continuous side walls is provided on the side surface of the cylinder block 8 directed to the vehicle's front side with an empty space 57 opening frontward formed inside the four side walls of the framework structure 56. There is further provided an internal wall 58 which divides the space 57 into upper and lower sections.

The cover 60 which is made of a synthetic resin is shaped to cover the aforementioned space 57. Specifically, the cover 60 is a one-piece element having an outer projecting wall 61 which goes into face-to-face contact with the framework structure 56, an inner projecting wall 62 which goes into face-to-face contact with the internal wall 58 and a baffle plate 63 located below the inner projecting wall 62. With the outer projecting wall 61 and the inner projecting wall 62 placed in face-to-face contact with the framework structure 56 and the internal wall 58 respectively, the cover 60 is bolted to the framework structure 56.

There is provided a blowby gas inlet 64 connected to the inside of a crankcase at the bottom of the oil separator chamber 55, Also, there is formed a cutout (not shown) for conducting the blowby gas in the inner projecting wall 62 of the cover 60. Further, there is provided a blowby gas outlet fitted with a positive crankcase ventilation (PCV) valve 65 in an upper end portion of the cover 60 which constitutes a front surface of the oil separator chamber 55.

One end of a PCV hose 66 constituting an external passage for conducting the blowby gas is connected to the PCV valve 65. The PCV hose 66 extends downward from the PCV valve 65 and a lower end of the PCV hose 66 is connected to the common intake passage section 14 near the joint portion 10 from engine body side (rear side).

Of the entire blowby gas passage running from the PCV valve 65 to the intake manifold 1 through the PCV hose 66, at least joints of the PCV hose 66 to the PCV valve 65 and the intake manifold 1 are arranged such that they are located behind the intake manifold 1 as viewed from the front side of the vehicle. In this embodiment, almost the entire blowby gas passage is arranged such that it is located behind the intake manifold 1. This means that, of the entire blowby gas passage, the PCV valve 65, the joint of the PCV hose 66 to the intake manifold 1 and most part of the PCV hose 66 are disposed such that they are located behind the intake manifold 1 as viewed from the front of the vehicle.

While the upstream portions of the branching pipes 12A–12D look as if they are joined together when viewed from the front of the vehicle as mentioned earlier, the PCV valve 65 and a portion of the PCV hose 66 near the PCV valve 65 are arranged such that they are located behind an area where the upstream portions of the branching pipes 12C, 12D are joined together. Also, the joint of the PCV hose 66 to the intake manifold 1 and a portion of the PCV hose 66 near this joint are arranged such that they are located behind the common intake passage section 14. Since the upstream portion of the branching pipe 12D and the common intake passage section 14 are situated close to each other, almost the entire blowby gas passage is hidden by them when viewed from the front of the vehicle.

The joint of the PCV hose 66 to the common intake passage section 14 of the intake manifold 1 is constructed as shown in FIG. 11, As previously stated, the intake manifold 1 of the present embodiment is made of a synthetic resin material and constructed by welding three separate portions 2a, 2b, 2c (FIG. 10) which are produced by injection molding. In this structure, the common intake passage section 14 is initially divided into a front part 14a and a rear part 14b. Butt ends of the two parts 14a, 14b at their butt joint portion are flat-shaped, and the rear part 14b is so shaped to have a pair of forward-projecting ridge-like projections 68, forming a groove 67 in between, and a rearward-projecting hose joint 69 which is connected to the groove 67. The front part 14a and the rear part 14b are individually injection-molded and welded to each other at their butt ends, whereby the groove 67 constitutes a blowby gas intake passage which is connected to a passage within the common intake passage section 14.

The blowby gas intake passage 67 and the hose joint 69 of the common intake passage section 14 are formed in this fashion and the PCV hose 66 is connected to the hose joint 69.

There is provided an EGR passage joint 70 to which the EGR passage is connected for recirculating exhaust gas at a point of the common intake passage section 14 near a throttle body 16 as shown in FIG. 9. Accordingly, an ISC passage 17 and an ISC valve 18 are provided on the front side and the EGR passage joint 70 is provided on the rear side near the upstream end of the common intake passage section 14.

In the aforementioned structure depicted in FIGS. 9 to 11, the exhaust manifold 50 is provided on the rear side of the engine body 6 and the intake manifold 1 to provided on the front side of the engine body 6. This structure is advantageous with respect to catalyst warming performance in an exhaust gas passage, for instance. Furthermore, since the intake manifold 1 is installed close to the cylinder block a and the cylinder head 7 of the engine body 6 with the joint portion 10 situated at a lower position and the oil separator chamber 55 is provided on the side surface of the cylinder block 8 on the vehicle's front side facing the intake manifold 1, the intake structure and the oil separator chamber 55 can be compactly incorporated in the engine.

As the PCV valve 65 is connected to the oil separator chamber 55 and the PCV hose 66 is connected between the PCV valve 65 and the intake manifold 1, blowby gas from which oil has been removed in the oil separator chamber 55 is circulated back to intake manifold 1 through the PCV valve 65 and the PCV hose 66. Since almost the entire blowby gas passage running from the PCV valve 65 to the intake manifold 1 through the PCV hose 66 is arranged such that it is located behind the intake manifold 1 as viewed from the front of the vehicle, it is possible to effectively prevent freezing of water content of the blowby gas.

The blowby gas contains water and, therefore, if the blowby gas passage is exposed to low-temperature airflow produced when the vehicle is running under extremely cold conditions, the water content of the blowby gas tends to freeze. Especially when the cover 60 of the oil separator chamber 55 and the intake manifold 1 are made of a synthetic resin, freezing is likely to occur because the amount of heat conducted from the engine body 6 to the PCV valve 65 and the PCV hose 66 is limited. In this embodiment, however, since almost the entire blowby gas passage running from the PCV valve 65 through the PCV hose 66 to the intake manifold 1 is arranged such that it is located behind the intake manifold 1 as viewed from the front of the vehicle, the airflow shown by arrows in FIG. 10 is blocked by the intake manifold 1. Consequently, cooling of the blowby gas passage by the airflow produced when the vehicle is running is sufficiently suppressed, thereby preventing freezing of the water content of the blowby gas.

While it is desirable to make the PCV hose 66 which is exposed to external air, or the length from the PCV valve 65 to the hose joint 69 at the intake manifold 1, as short as possible for preventing water from freezing in the blowby gas passage, it becomes difficult to connect the PCV hose 66 to the PCV valve 65 and the hose joint 69 on the rear side of the intake manifold 1 if that length is made too short. Generally, it is necessary to more or less provide an extra length of the PCV hose 66 with respect to the distance between the PCV valve 65 and the hose joint 69 to facilitate this connecting work. If the PCV hose 66 bends in a U-shape, however, water is likely to be entrapped and freeze in a U-shaped part.

The aforementioned points are taken into consideration in this embodiment and, accordingly, the PCV valve 65 is disposed such that it is located behind the upstream portions of the branching pipes 12C, 12D, the hose joint 69 at the intake manifold 1 is provided on the rear side of the common intake passage section 14 near the joint portion 10, and the PCV hose 66 extends downward from the PCV valve 65 with the lower end of the PCV hose 66 connected to the hose joint 69. Thus, the PCV hose 66 can be easily connected to the PCV valve 65 and the hose joint 69 and, because the PCV hose 66 is relatively short, it does not bend in a U-shape, effectively preventing freezing of the water content of the blowby gas.

Furthermore, since the PCV hose 66 is connected to the common intake passage section 14 in the vicinity of the joint portion 10 and the EGR passage joint 70 is provided near the upstream end of the common intake passage section 14 that is close to the throttle body 16, the length of intake passage between the joint of the PCV hose 66 to the common intake passage section 14 and the EGR passage joint 70 is made as long as possible. This structure also serves to effectively prevent freezing of the water content of the blowby gas. More specifically, freezing or condensation of water is likely to occur if concentrated water content of EGR gas flows into an area of the common intake passage section 14 where the cold blowby gas flows in. If the length of the intake passage from the point of the EGR passage joint 70 to the joint of the PCV hose 66 is long, the water content of the EGR gas is sufficiently dispersed until the EGR gas recirculated into the common intake passage section 14 reaches an area around the joint of the PCV hose 66, which is advantageous for preventing freezing or condensation of the water content.

While almost the entire blowby gas passage running from the PCV valve 65 to the intake manifold 1 through the PCV hose 66 is arranged such that it is located behind the intake manifold 1 in the structure illustrated in FIGS. 9 to 11, sites of the entire blowby gas passage where the water content is most likely to occur are areas around the PCV valve 65 and the joint of the PCV hose 66 to the PCV valve 65. Therefore, at least the areas around the PCV valve 65 and the joint of the PCV hose 66 to the PCV valve 65 should be arranged such that they are located behind the intake manifold 1 as viewed from the front side of the vehicle.

FIGS. 12 to 17 show an example of a preferred construction of joints of an EGR passage and an ISC passage 17 an upstream end portion of an intake manifold 1 according to another embodiment of the invention.

The intake manifold 1 shown in these Figures is made of a heat-resistant resin and installed on an in-line four-cylinder reciprocating engine. A common intake passage section 14 constituting a common intake passage 15 extends downstream of a throttle body 16 which supports a throttle valve TV in a manner that it can be opened and closed. An ISC valve 18 and an opening end 71 of the EGR passage (not shown) are provided at an upstream end portion of the common intake passage section 14, downstream of the throttle body 16. A joint portion 10 is provided downstream of the common intake passage section 14, and branching pipes 12A, 12B, 12C, 12D branch out from the joint portion 10. Independent intake passages formed by these branching pipes 12A, 12B, 12C, 12D connect to intake ports 22A, 22B, 22C, 22D of the four-cylinder engine, respectively.

The joint portion 10 is attached to a side wall of a cylinder block 8 located below the intake ports 22A, 22B, 22C, 22D.

The ISC valve 18 is provided halfway in the ISC passage 17 which bypasses the common intake passage 15 between its portions upstream and downstream of the throttle valve TV. To regulate the amount of bypass air conducted through the ISC passage 17, its flow passage area is electrically controlled by an unillustrated ISC valve actuator.

The ISC valve 18 performs control operation for maintaining a constant engine idle speed. Specifically, under idle conditions where the throttle valve TV is fully closed, the ISC valve 18 controllably opens and closes the ISC passage 17 to operate the engine at an optimum idle speed. Also, when the vehicle speed exceeds a specific value, the ISC valve actuator performs control operation to slightly close the ISC valve 18 as compared to its position in the idle conditions to reduce the amount of bypass air, and when the vehicle speed becomes less than a specific value, the ISC valve actuator terminates this valve-closing control operation to prepare the ISC valve 18 to control the engine idle speed.

The opening end 71 of the EGR passage through which exhaust gas is recirculated from an EGR unit is provided at an upstream end portion of the common intake passage 15 downstream of the throttle body 16, the opening end 71 projecting from an EGR passage joint 70 formed on the common intake passage section 14. The EGR passage passes through a cylinder head 7 and connects to the opening end 71 via a side wall of the cylinder head 7, where the EGR passage joint 70 is connected to the side wall of the cylinder head 7. The EGR unit regulates the amount of exhaust gas recirculated into the common intake passage 15 by controlling the opening of an EGR valve. Part of exhaust gas discharged from an exhaust port is recirculated by the EGR unit and introduced into a combustion chamber together with air-fuel mixture. This exhaust gas recirculation serves to lower maximum combustion temperature and decrease the amount of nitrogen oxides (NOx) contained in the exhaust gas.

The ISC valve 18 is provided at a point of the common intake passage 15 facing the opening end 71 of the EGR passage in a longitudinal direction of the common intake passage 15. The opening end 71 of the EGR passage and the ISC valve 18 are located opposite each other on both sides of a central axis of the common intake passage 15 (or opposite each other on both sides of the common intake passage 15).

The ISC passage 17 bulges outward from an outer wall 16a of an intake opening of the throttle body 16 where the throttle valve TV is provided. The ISC passage 17 includes an intake air inlet 17a, an intake air passage 17b connected to the integrally formed intake air inlet 17a for introducing air into the ISC valve 18, the intake air passage 17b forming a double-wall structure with the outer wall 16a, and an intake air outlet channel 17c for introducing air into the common intake passage 15 immediately downstream of the throttle valve TV via the ISC valve 18.

An opening 17d of the intake air outlet channel 17c to the common intake passage 15 is located at a position offset from the opening end 71 of the EGR passage along the common intake passage 15, so that the opening 17d of the intake air outlet channel 17c and the opening end 71 of the EGR passage are not located opposite each other or close to each other in the common intake passage 15.

The intake air passage 17b and the intake air outlet channel 17c are formed such that they run parallel to each other. They bulge outward from an outer wall 15a of the common intake passage 15. The intake air passage 17b and the intake air outlet channel 17c are formed integrally with the outer wall 15a, producing a double-wall structure with the outer wall 15a.

Since the opening end 71 of the EGR passage and the opening 17d of the ISC passage 17 to the common intake passage 15 are offset from each other in the example shown in FIGS. 12 to 17 as stated above, exhaust gas is introduced near the central axis of the common intake passage 15. This helps achieve even distribution of EGR gas into individual cylinders. The aforementioned double-wall structure serves to prohibit carbon contained in the exhaust gas which is introduced through the EGR passage from reaching the ISC valve 18, making it possible to remove the cause of malfunctioning due to adhesion of carbon to the ISC valve 18, despite the fact that the opening end 71 of the EGR passage is located close to the ISC passage 17.

Furthermore, since the ISC passage 17 is integrally formed with the common intake passage 15 in such a way that at least part of the outer wall 15a of the common intake passage 15 produces the double-wall structure in which the ISC passage 17 exists between the outer wall 15a and the ISC valve 18, carbon contained in the exhaust gas which is introduced through the EGR passage does not intrude through the intake air outlet channel 17c and seal members for sealing the ISC valve 18 and a gap between the ISC valve 18 and the ISC passage 17 are not exposed to the high-temperature exhaust gas introduced through the EGR passage. This serves to prevent deterioration of the ISC valve 18 and the seal members.

Furthermore, while the upstream end portion of the common intake passage section 14 where the throttle body 16 is fixed is made of a heat-resistant resin, the aforementioned double-wall structure at the outer wall 15a of the common intake passage 15 serves to increase the stiffness of a portion from a point where the common intake passage section 14 is attached to the side wall of the cylinder block 8 to a point where the throttle body 16 is attached to the common intake passage section 14. Therefore, the common intake passage section 14 can sufficiently support the throttle body 16 which is a heavy object.

FIGS. 18 to 22 show a modification of the construction depicted in FIGS. 12 to 17. While an intake manifold 1 shown in these Figures is also made of a heat-resistant resin and installed on an in-line four-cylinder reciprocating engine, engine layout differs from that of the example shown in FIGS. 12 to 17. Specifically, a surge tank 10' is fitted to an upper part of a cylinder head above intake ports. The surge tank 10' constitutes a joint portion joining together upstream ends of four branching pipes 12A, 12B, 12C, 12D which form independent intake passages connected to the respective intake ports. The surge tank 10' is connected at its upstream side to a common intake passage section 14 which constitutes a common intake passage.

An EGR passage 75 is provided on the exterior of the cylinder head, as if surrounding the branching pipes 12A, 12B, 12C, 12D forming the independent intake passages.

The intake manifold 1 of this example is otherwise equivalent to the example shown in FIGS. 12 to 17 and, therefore, elements having the same function and construction are designated by the same reference numerals and a description of such elements is omitted.

While the invention has been described, by way of example, with reference to the in-line four-cylinder engines, it is also applicable to any other types of engines, such as V-type, horizontally opposed type and rotary engines. The number of cylinders is not limited to four. The invention applicable to engines having three, five, five, six, eight or more cylinders as well.

In summary, according to the aforementioned descriptions, the present invention relates to an intake manifold of an engine comprising a manifold body, a plurality of intake passages branching out from a joint portion of the manifold body, a multiple on-off valve mechanism which is provided at downstream end portions of individual intake passages, the multiple on-off valve mechanism having a plurality of on-off valves linked to a common shaft, frame members formed separately from the manifold body are fitted in the downstream end portions of individual intake passage sections, the on-off valves are placed inside the individual frame members and the shaft is passed through the on-off valves in such a way that the frame members constitute parts of inside walls of the intake passages where the on-off valves are located, the frame members rotatably supporting the on-off valves and the shaft, and wherein a cutout is formed in a surrounding wall of each frame member, the cutout extending along the intake passage axis line all across the surrounding wall and thereby making each frame member elastically expandable and compressible.

In this construction, the on-off valves are assembled in the frame members, the frame members are fitted in the downstream end portions of the individual intake passage sections, and the shaft is assembled. This construction facilitates assembly of the intake manifold provided with the multiple on-off valve mechanism. Especially because the frame members are expandable and compressible by elastic deformation, the on-off valves can be easily fitted in the frame members and the frame members can be inserted into the downstream end portions of the intake passage sections with ease.

Preferably, protruding walls swelling outward on both sides of the cutout be formed on each frame member along the cutout, and a recessed part for accommodating the protruding walls be formed in a wall surface of each intake passage section of the manifold body. Furthermore, it is preferable to form a guide rail which fits in the cutout of the frame member in the recessed part.

In this construction, the protruding walls help increase the stiffness of each frame member by reinforcing it at both sides of the cutout. The protruding walls and the guide rail together serve to correctly position the frame member when it is fitted in the downstream end portion of the relevant intake passage section.

In one form of the invention, a journal portion through which the shaft is passed is formed on the on-off valve placed inside each frame member, and bosses serving as bearings for supporting the journal portion of the on-off valve are provided on both sides of the frame member, wherein a portion of each boss protruding to the inside of the frame member has generally a semilunar shape having an arc-shaped surface extending at least along a semicircle.

This construction further facilitates assembly of the on-off valves into the frame members and provides sufficient bearing surfaces for the on-off valves and the shaft.

In another form of the invention, a downstream portion of each intake passage section from its halfway point to a point immediately adjacent to a site where the frame member is fitted has a straight shape, the manifold body is shaped such that the inclination of the axis line of the straight portion of the intake passage section differs from the inclination of the axis line of a corresponding intake passage formed in an engine body when the intake manifold is joined to the engine body, and the frame member is formed such that the axis line of its inner passage has an inclination which is set smoothly connects between the axis line of the straight portion of the intake passage section and the axis line of the corresponding intake passage in the engine body.

This construction serves to increase the degree of freedom of design with respect to the length of each intake passage section, for instance, prevent sudden change in the direction of intake gas flow in the downstream end portion of each intake passage section.

In still another form of the invention, the intake manifold is joined to the engine body in such a manner that each intake passage section of the manifold body and the frame member fitted therein match the corresponding intake passage in the engine body, and a stepped peripheral edge whose inner periphery is larger than the outer periphery of the downstream end of the frame member by a specific amount is formed at the downstream end of each intake passage section such that the stepped peripheral edge and an outer peripheral surface of the frame member together forming a seal groove therebetween.

This makes it possible to ensure good sealing performance of the intake passages by a simple structure.

This application is based on Japanese patent application serial numbers 2000-297113 filed on Sep. 28, 2000; 2000-301265 filed on Sep. 29, 2000; and 2000-301266 filed on Sep. 29, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An intake manifold of an engine comprising:

a manifold body;

a plurality of intake passages branching out from a joint portion of the manifold body;

a multiple on-off valve mechanism which is provided at downstream end portions of the individual intake passages, the multiple on-off valve mechanism having a plurality of on-off valves linked to a common shaft;

frame members formed separately from the manifold body are fitted in the downstream end portions of individual intake passage sections, the on-off valves are placed inside the individual frame members and the shaft is passed through the on-off valves in such a way that the frame members constitute parts of inside walls of the intake passages where the on-off valves are located, the frame members rotatably supporting the on-off valves and the shaft; and wherein a cutout is formed in a surrounding wall of each frame member, the cutout extending along the intake passage axis line all across the surrounding wall and thereby making each frame member elastically expandable and compressible.

2. An intake manifold of an engine according to claim 1, wherein protruding walls swelling outward on both sides of the cutout are formed on each frame member along the cutout, and a recessed part for accommodating the protruding walls is formed in a wall surface of each intake passage section of the manifold body.

3. An intake manifold of an engine according to claim 2, wherein a guide rail which fits in the cutout of the frame member is formed in the recessed part.

4. An intake manifold of an engine according to claim 1, wherein a journal portion through which the shaft is passed is formed on the on-off valve placed inside each frame member, and bosses serving as bearings for supporting the journal portion of the on-off valve are provided on both sides of the frame member, and wherein a portion of each boss protruding to the inside of the frame member has generally a semilunar shape having an arc-shaped surface extending at least along a semicircle.

5. An intake manifold of an engine according to claim 1, wherein a downstream portion of each intake passage section from its halfway point to a point immediately adjacent to a site where the frame member is fitted has a straight shape, the manifold body is shaped such that the inclination of the axis line of the straight portion of the intake passage section differs from the inclination of the axis line of a corresponding intake passage formed in an engine body when the intake manifold is joined to the engine body, and the frame member is formed such that the axis line of its inner passage has an inclination which is set to smoothly connect between the axis line of the straight portion of the intake passage section and the axis line of the corresponding intake passage in the engine body.

6. An intake manifold of an engine according to claim 1, wherein the intake manifold is joined to the engine body in such a manner that each intake passage section of the manifold body and the frame member fitted therein match the corresponding intake passage in the engine body, and a stepped peripheral edge whose inner periphery is larger than the outer periphery of the downstream end of the frame member by a specific amount is formed at the downstream end of each intake passage section such that the stepped peripheral edge and an outer peripheral surface of the frame member together forming a seal groove therebetween.

* * * * *